US012658943B2

(12) United States Patent
Pehlke

(10) Patent No.: US 12,658,943 B2
(45) Date of Patent: Jun. 16, 2026

(54) SYSTEMS AND METHODS FOR REDUCING SWITCHING IN COMMUNICATION MODULES

(71) Applicant: SKYWORKS SOLUTIONS, INC., Irvine, CA (US)

(72) Inventor: David Richard Pehlke, Westlake Village, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 349 days.

(21) Appl. No.: 18/206,466

(22) Filed: Jun. 6, 2023

(65) Prior Publication Data

US 2023/0403033 A1     Dec. 14, 2023

Related U.S. Application Data

(60) Provisional application No. 63/366,071, filed on Jun. 9, 2022.

(51) Int. Cl.
*H04B 1/44*     (2006.01)
*H04B 1/00*     (2006.01)

(52) U.S. Cl.
CPC ......... *H04B 1/0053* (2013.01); *H04B 1/0078* (2013.01)

(58) Field of Classification Search
CPC .... H04B 1/0053; H04B 1/0057; H04B 1/006; H04B 1/0064; H04B 1/0078; H04B 1/16; H04B 1/40; H04B 1/44
See application file for complete search history.

(56) References Cited

U.S. PATENT DOCUMENTS

2005/0227631 A1* 10/2005 Robinett ................ H04B 1/006
                                                                      455/168.1
2015/0304000 A1* 10/2015 Wloczysiak ............. H04B 1/44
                                                                      455/78
2020/0412403 A1* 12/2020 Pehlke ...................... H04L 5/14
2023/0089569 A1*  3/2023 Lee ...................... H04B 1/0057
                                                                      375/347

* cited by examiner

*Primary Examiner* — Tuan Pham
(74) *Attorney, Agent, or Firm* — Lando & Anastasi, LLP

(57) ABSTRACT

Examples of the disclosure include a front-end module comprising at least one antenna connection configured to be coupled to at least one antenna, at least one transceiver connection configured to be coupled to at least one transceiver, a plurality of ganged signal paths coupled between the at least one antenna connection and the at least one transceiver connection, the plurality of ganged signal paths corresponding to a plurality of non-overlapping communication bands, and a plurality of switchable signal paths switchably coupled between the at least one antenna connection and the at least one transceiver connection.

17 Claims, 14 Drawing Sheets

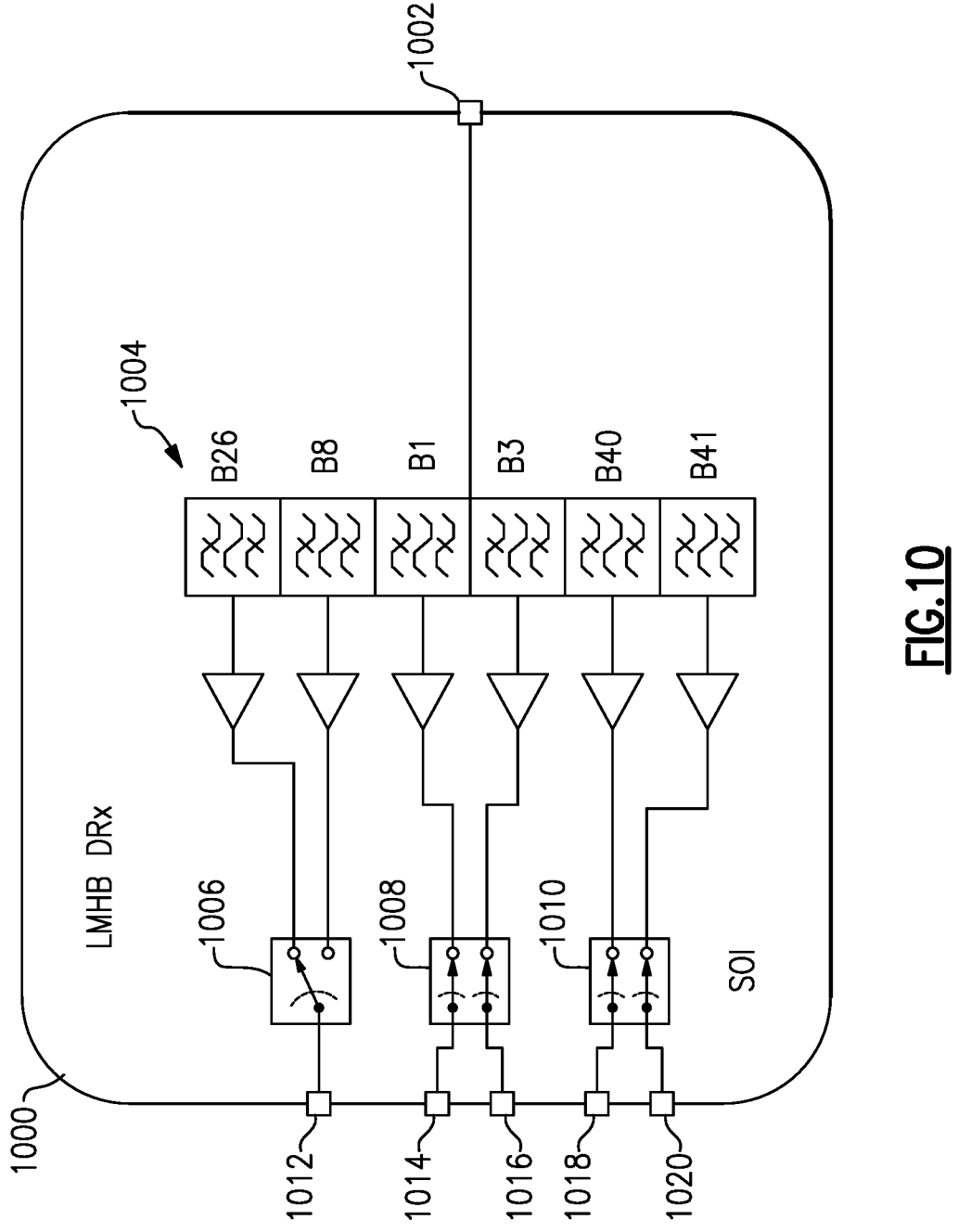
_FIG.10_

SYSTEMS AND METHODS FOR REDUCING SWITCHING IN COMMUNICATION MODULES

CROSS-REFERENCE TO RELATED APPLICATIONS

This application claims priority under 35 U.S.C. § 119(e) to U.S. Provisional Application Ser. No. 63/366,071, titled "SYSTEMS AND METHODS FOR REDUCING SWITCHING IN COMMUNICATION MODULES," filed on Jun. 9, 2022, which is hereby incorporated by reference in its entirety.

BACKGROUND

1. Field of the Disclosure

At least one example in accordance with the present disclosure relates generally to RF communication devices.

2. Discussion of Related Art

Electronic devices, such as mobile cellular devices, may exchange information with other electronic devices. A mobile cellular device may include one or more antennas to transmit and receive signals. Some mobile cellular devices may include additional components and circuitry to process signals transmitted and received via the antenna. For example, a mobile cellular device may include one or more switching modules to route signals to different receive or transmit paths.

SUMMARY

According to at least one aspect of the present disclosure, a front-end module is provided comprising at least one antenna connection configured to be coupled to at least one antenna, at least one transceiver connection configured to be coupled to at least one transceiver, a plurality of ganged signal paths coupled between the at least one antenna connection and the at least one transceiver connection, the plurality of ganged signal paths corresponding to a plurality of non-overlapping communication bands, and a plurality of switchable signal paths switchably coupled between the at least one antenna connection and the at least one transceiver connection.

In at least one example, the plurality of ganged signal paths is connected directly to the at least one antenna connection. In various examples, the plurality of switchable signal paths is switchably coupled to the at least one antenna connection via at least one switching module. In some examples, the at least one switching module includes a first connection coupled between the plurality of ganged signal paths and the at least one antenna connection, and a plurality of second connections. In at least one example, each second connection of the plurality of second connections is coupled to at least one signal path of the plurality of switchable signal paths. In various examples, at least one second connection of the plurality of second connections is coupled to a plurality of ganged switchable signal paths of the plurality of switchable signal paths.

In some examples, the plurality of ganged switchable signal paths corresponds to a second plurality of non-overlapping communication bands. In at least one example, the plurality of ganged signal paths is connected directly to the at least one antenna connection via a direct connection, and wherein the first connection of the at least one switching module is coupled to the direct connection. In various examples, the plurality of switchable signal paths includes a first signal path corresponding to a first frequency range and a second signal path corresponding to a second frequency range, wherein the first frequency range overlaps the second frequency range or shares a common band edge with the second frequency range.

In some examples, the plurality of switchable signal paths includes a first signal path corresponding to a first frequency range and a second signal path corresponding to a second frequency range, wherein the first frequency range does not overlap with the second frequency range, and wherein an upper bound of the first frequency range is within a threshold frequency value of a lower band of the second frequency range.

In at least one example, the front-end module includes a diversity receive module including the at least one antenna connection, the at least one transceiver connection, the plurality of ganged signal paths, and the plurality of switchable signal paths. In various examples, the front-end module includes a power-amplifier-with-integrated-duplexer module including the at least one antenna connection, the at least one transceiver connection, the plurality of ganged signal paths, and the plurality of switchable signal paths.

In some examples, the plurality of ganged signal paths and the plurality of switchable signal paths collectively support the B1, B3, B8, B26, B34, B39, B40, and B41 communication bands. In at least one example, the plurality of ganged signal paths supports the B1, B8, B26, and B40 communication bands. In various examples, the plurality of switchable signal paths supports the B3, B34, B39, and B41 communication bands. In some examples, the plurality of switchable signal paths supports the B7 communication band. In at least one example, the plurality of ganged signal paths supports the B34 and B41 communication bands. In various examples, the plurality of switchable signal paths supports the B3 and B39 communication bands.

According to at least one example of the disclosure, a communication device is provided comprising at least one antenna, at least one transceiver, and signal-processing circuitry including at least one antenna connection coupled to the at least one antenna, at least one transceiver connection coupled to the at least one transceiver, and a plurality of ganged signal paths coupled between the at least one antenna connection and the at least one transceiver connection, the plurality of ganged signal paths corresponding to a plurality of non-overlapping communication bands and being connected directly to the at least one antenna connection.

In at least one example, the plurality of ganged signal paths supports B1, B3, B8, B26, B40, and B41 communication bands.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 10 illustrates a schematic diagram of a receive module according to a sixth example;

DETAILED DESCRIPTION

Figure 1:
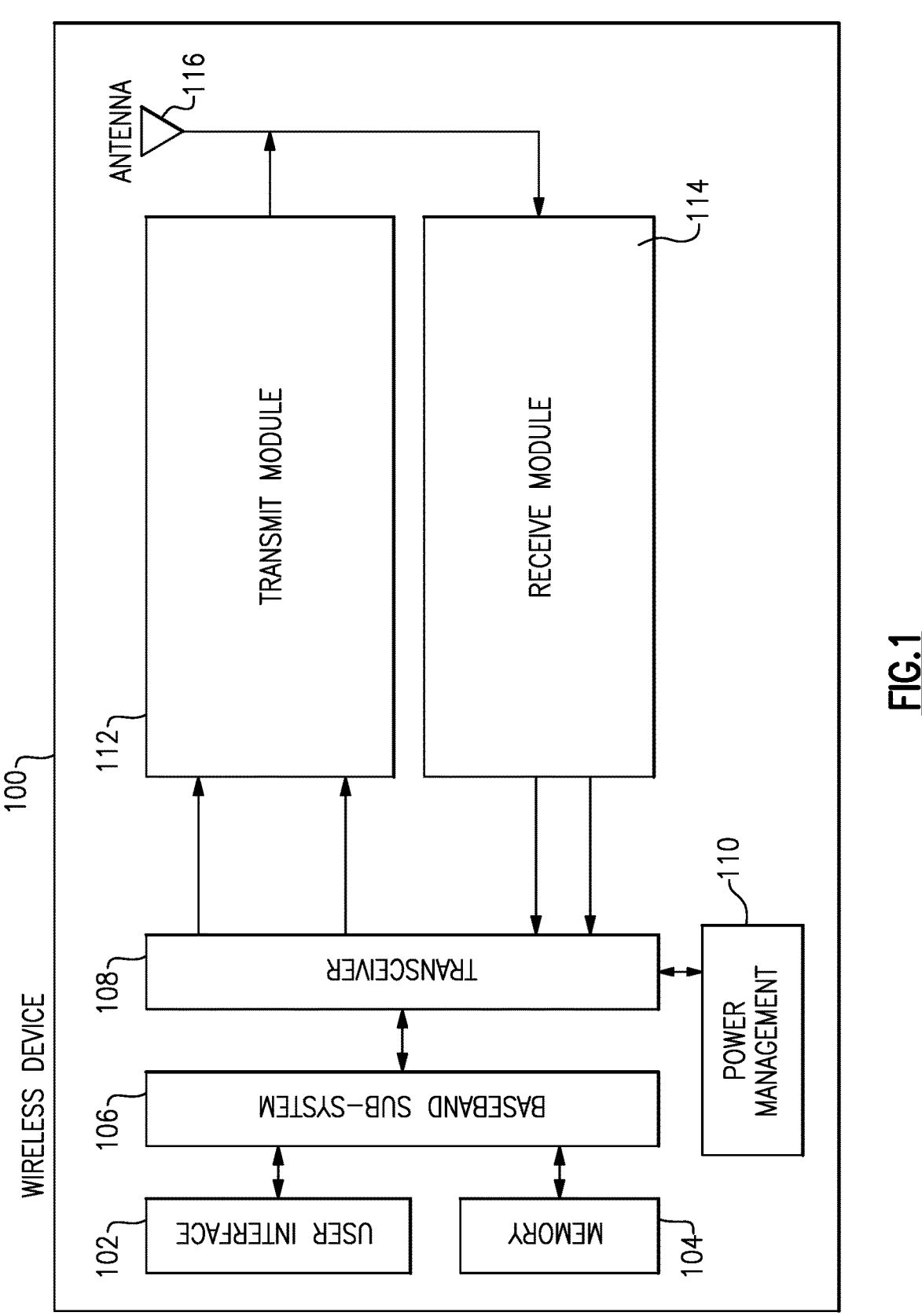
FIG. 1 illustrates a block diagram of a wireless device according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Electronic devices, such as mobile cellular devices, may exchange information with other electronic devices. Some mobile cellular devices may transmit and receive radio-frequency (RF) signals via one or more antennas. Using receive signals as an example, a mobile cellular device may receive RF signals in any of several communication bands, such as the B3 communication band (1805-1880 MHz), the B8 communication band (925-960 MHz), the B26 communication band (859-894 MHz), and so forth.

A diversity-receive module (DRx) in a mobile cellular device may include several receive signal paths each corresponding to a respective communication band. Each receive signal path may include a filter and a low-noise amplifier (LNA) to process the receive signal. In some examples, a mobile cellular device may include an antenna switch module (ASM) to route received signals to an appropriate signal path. For example, an ASM may include one input for receive signals received at one or more antennas, and n switchable outputs, where n represents the number of communication bands that the mobile cellular device operates over. The ASM may route the receive signal to the switchable output coupled to the receive signal path corresponding to the receive signal.

An ASM may ensure that a receive signal is provided to an appropriate signal path, and is not provided to an inappropriate signal path. If a receive signal has a frequency that falls within multiple overlapping frequency bands but is only intended for a single communication band, the ASM may ensure that the receive signal is provided to that single communication band. For example, the B7 communication band (2620-2690 MHz) overlaps the B41 communication band (2496-2690 MHz). An ASM may ensure that a receive signal intended for the B7 communication band is provided only to the B7 receive signal path, and not to the B41 receive signal path. However, the ASM may also occupy valuable silicon-on-insulator (SOI) die area, impose in-line series insertion loss, and increase device cost. Although these examples are provided with respect to receive signals in a DRx, similar principles apply to transmit signals in, for example, a power-amplifier-with-integrated-duplexer (PAiD) module in a mobile cellular device.

Examples provided herein reduce or eliminate switching requirements in one or more communication modules. In one example, two or more signal paths (for example, receive or transmit paths) corresponding to non-overlapping frequency bands are coupled in parallel (or "ganged") between a baseband system and an antenna connection without implementing switch modules. In some examples, signal paths which do overlap with one or more of the ganged signal paths are connected in parallel with the ganged signal paths via one or more switching modules. Accordingly, although switching modules may be implemented, signals intended for the ganged signal paths may bypass the switching modules and thereby improve insertion loss. Examples provided herein therefore reduce cost, improve in-line series insertion loss, and/or decrease an amount of die area consumed by switching modules.

Examples of the disclosure may be implemented in connection with many types of electronic devices or systems, such as consumer electronics (for example, televisions, gaming consoles, personal computers, tablet computers, desktop computers, and so forth), vehicles, communication equipment, electrical-utility equipment, or other devices or systems having communication functionality. For purposes of explanation, examples are provided with reference to mobile cellular devices. For example, a mobile cellular device may include a mobile telephone, such as a smartphone. However, the principles of the disclosure are more broadly applicable to any of various communication devices, and mobile cellular devices are described for purposes of example only.

FIG. 1 illustrates a block diagram of a wireless device 100 according to an example. The wireless device 100 can be a cellular phone, smart phone, tablet, modem, communication network or any other portable or non-portable device configured for voice and/or data communication. The implementation shown in FIG. 1 is exemplary and non-limiting. The wireless device 100 includes a user interface 102, memory and/or storage 104, a baseband sub-system 106, a transceiver 108, a power-management system 110, a transmit module 112, a receive module 114, and one or more antennas 116 ("antenna 116").

The antenna 116 is configured to transmit and/or receive one or more signals, such that the wireless device 100 may communicate with one or more external devices via the antenna 116. The transceiver 108 is configured to generate signals for transmission and/or to process received signals. Signals generated for transmission are provided to the transceiver 108 to the transmit module 112. The transmit module 112 may include one or more power amplifiers (PAs) which amplify the signals received from the transceiver 108. The transmit module 112 can be used to amplify a wide variety of RF or other frequency-band transmission signals, including RF signals across multiple different communication bands. For example, the transmit module 112 can receive an enable signal that can be used to pulse the output of a power amplifier to aid in transmitting a wireless local-area-network (WLAN) signal or any other suitable pulsed signal.

The transmit module 112 can be configured to amplify any of a variety of types of signals, including, for example, 5G signals, a Global System for Mobile (GSM) signal, a code-division multiple-access (CDMA) signal, a W-CDMA signal, a Long-Term-Evolution (LTE) signal, or an EDGE signal. In certain embodiments, the PA module 112 and associated components including switches and the like can be fabricated on GaAs substrates using, for example, pHEMT or BiFET transistors, or on a silicon substrate using CMOS transistors. The wireless device 100 also includes the receive module 114, which may include one or more LNAs configured to amplify received signals in a similar or different manner as PAs of the transmit module 112.

The power-management system 110 is connected to the transceiver 108 and is configured to manage the power for the operation of the wireless device 100. The power-management system 110 can also control the operation of the wireless device 100, such as by controlling components of the modules 112, 114. The power-management system 110 can include, or can be connected to, an energy-storage device such as a battery that supplies power for the various components of the wireless device 100. The power-management system 110 can further include one or more processors or controllers that can control the transmission of signals and can also configure components of the wireless device 100 based upon the frequency of the signals being transmitted or received, for example. In addition, the processor(s) or controller(s) of the power-management system 110 may provide control signals to actuate switches, tune components, or otherwise configure components of the wireless device 100. In at least one embodiment, the processor(s) or controller(s) of the power-management system 110 can also provide control signals to control the modules 112, 114 to operate in the transmit or receive mode.

In one embodiment, the baseband sub-system 106 is connected to the user interface 102 to facilitate various input and output of voice and/or data provided to and received from the user. The baseband sub-system 106 can also be connected to the memory and/or storage 104 which is configured to store data and/or instructions to facilitate the operation of the wireless device, and/or to provide storage of information for the user.

As discussed above, the transmit module 112 may include one or more components not specifically illustrated. For example, the transmit module 112 may include at least one coupler 114 having one or more coupler sections for measuring transmitted power signals from one or more PAs in the transmit module 112, and for providing one or more coupled signals to at least one sensor. The at least one sensor may sense properties of the coupled signals and provide sense signals indicative of the sensed coupled signals to the transceiver 108, the power-management system 110, or another component or device. For example, the sense signals may provide feedback for adjusting a power level of one or more PAs or LNAs such that the coupler may be used to boost or decrease power of a transmission signal having a relatively high or low power. In some examples, such a coupler may be configured to measure power signals transmitted from one or more LNAs in the receive module 114. In various examples, the receive module 114 may include one or more couplers in addition to, or in lieu of, couplers in the transmit module 112 to measure power signals transmitted from LNAs in the receive module 114.

In certain examples in which the wireless device 100 is a mobile phone having a time division multiple access (TDMA) architecture, one or more couplers (for example, in the transmit module 112 and/or receive module 114) may advantageously manage the amplification of an RF power signal transmitted from a PA or LNA. In a mobile phone having a TDMA architecture, such as those found in GSM, CDMA, and W-CDMA systems, PAs can be used to shift power envelopes up and down within prescribed limits of power versus time. For instance, a particular mobile phone can be assigned a transmission time slot for a particular frequency channel. In this case the transmit module 112 and/or the receive module 114 can be employed to aid in regulating the power level one or more RF power signals over time, so as to prevent signal interference from transmission during an assigned receive time slot and to reduce power consumption.

In operation, the transmit module 112 may receive input signals from the transceiver 108, process the input signals, and provide transmit signals to the antenna 116, which may include several antennas. The transmit module 112 may include a PAiD having several signal paths, each including at least one PA and at least one filter to process a received input signal. Each signal path may be associated with a respective communication band, and may be configured to process signals within that communication band. For example, the at least one filter may include a bandpass filter configured to pass input signals having a frequency within that communication band. In some examples, the transmit module 112 may include a switching module to route input signals to a corresponding signal path.

The receive module 114 may receive signals from the antenna 116, process the receive signals, and provide output signals to the transceiver 108. The receive module 114 may include a DRx module having several signal paths, each including at least one LNA and at least one filter to process a receive signal. Each signal path may be associated with a respective communication band, and may be configured to process signals within that communication band. For example, the at least one filter may include a bandpass filter configured to pass receive signals having a frequency within that communication band. In some examples, the receive module 114 may include an ASM to route receive signals to a corresponding signal path.

Figure 2:
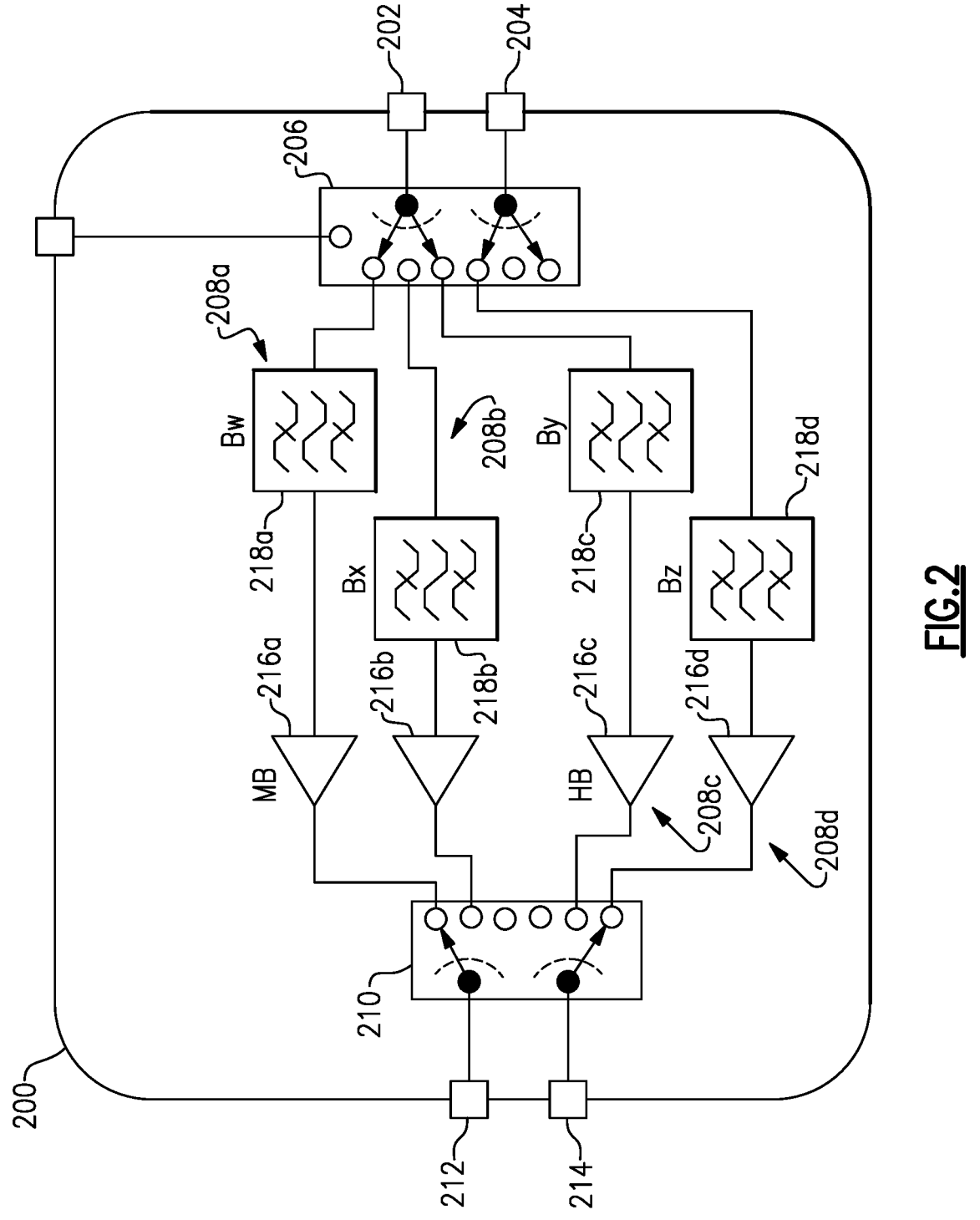
FIG. 2 illustrates a schematic diagram of a receive module according to a first example.

FIG. 2 illustrates a schematic diagram of a receive module 200 according to a first example. For example, the receive module 200 may be an example of the receive module 114. The receive module 200 includes a first antenna input 202, a second antenna input 204, an ASM 206, a first signal path 208a, a second signal path 208b, a third signal path 208c, a fourth signal path 208d, a switching module 210, a first output 212, and a second output 214. The first signal path 208a includes a first LNA 216a and a first filter 218a. The second signal path 208b includes a second LNA 216b and a second filter 218b. The third signal path 208c includes a third LNA 216c and a third filter 218c. The fourth signal path 208d includes a fourth LNA 216d and a fourth filter 218d. The signal paths 208a-208d may be collectively referred to as "signal paths 208." Each of the signal paths 208 may correspond to a respective communication band, such as B1, B3, B8, and so forth.

The first antenna input 202 and the second antenna input 204 are each coupled to the ASM 206, and are configured to be coupled to respective antennas. For example, the first antenna input 202 may be coupled to a mid-band antenna and the second antenna input 204 may be coupled to a high-band antenna, both of which may be examples of the antenna 116. The antenna 116 may include multiple antennas (including, for example, a mid-band antenna and a high-band antenna), or may include a single antenna (including, for example, a low-, mid-, and/or high-band antenna).

A receive signal received from the antenna 116 may be provided by the first antenna input 202 and/or the second antenna input 204 to the ASM 206. The ASM 206 may route the receive signal to a corresponding signal path of the signal paths 208. For example, if a receive signal received at the first antenna input 202 is a B1 signal and the first signal path 208a corresponds to the B1 communication band, the ASM 206 may route the receive signal to the first signal path 208a. The first filter 218a filters the receive signal provided by the ASM 206 and provides the filtered signal to the first LNA 216a, which amplifies the filtered signal. The first LNA 216a outputs an amplified signal to the switching module 210, which routes the amplified signal to the first output 212. The amplified signal may then be sent to a transceiver (for example, the transceiver 108) for processing.

Accordingly, the receive module 200 provides one example of processing and routing receive signals from, for example, the antenna 116 to the transceiver 108. The ASM 206 effectively ensures that receive signals are provided to a correct signal path by only providing the receive signal to the correct signal path. However, as discussed above, the ASM 206 also consumes die area and may introduce in-series insertion loss between the inputs 202, 204 and the signal paths 208.

Figure 3:
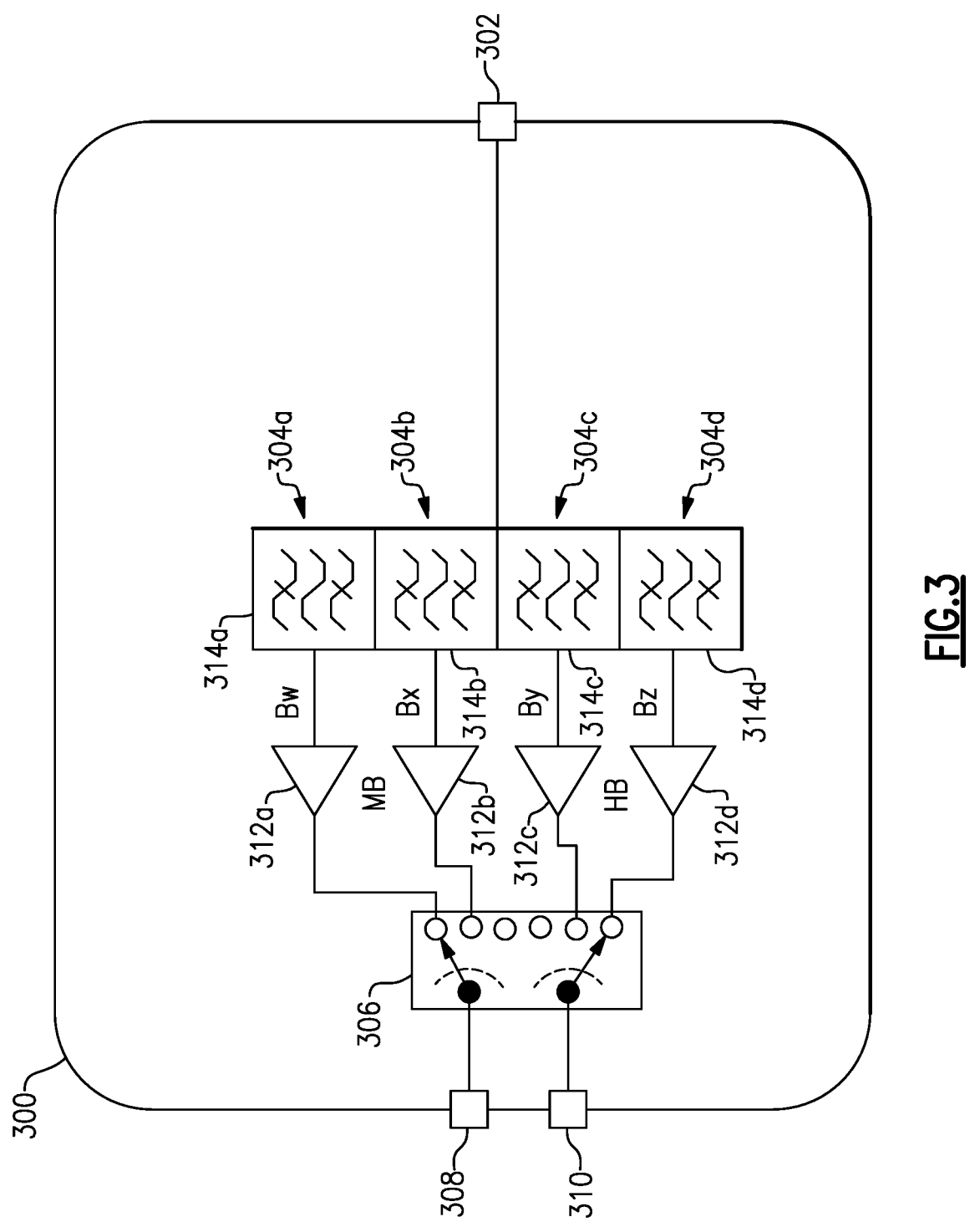
FIG. 3 illustrates a schematic diagram of a receive module according to a second example.

FIG. 3 illustrates a schematic diagram of a receive module 300 according to a second example. For example, the receive module 300 may be an example of the receive module 114. The receive module 300 includes an antenna input 302, a first signal path 304a, a second signal path 304b, a third signal path 304c, a fourth signal path 304d, a switching module 306, a first output 308, and a second output 310. The first signal path 304a includes a first LNA 312a and a first filter 314a. The second signal path 304b includes a second LNA 312b and a second filter 314b. The third signal path 304c includes a third LNA 312c and a third filter 314c. The fourth signal path 304d includes a fourth LNA 312d and a fourth filter 314d. The signal paths 304a-304d may be collectively referred to as "signal paths 304." Each of the signal paths 304 may correspond to a respective communication band, such as B1, B3, B8, and so forth.

The antenna input 302 is coupled to each of the filters 314a-314d ("filters 314") and is configured to be coupled to one or more antennas, such as the antenna 116. For example, the antenna 116 may include a mid-band antenna and a high-band antenna. Each of the filters 314 is coupled to the antenna input 302 at a respective first connection, and to a respective one of the LNAs 312a-312d ("LNAs 312") at a second connection. For example, the first filter 314a is coupled to the first LNA 312a, the second filter 314b is coupled to a second LNA 312b, and so forth. Each of the LNAs 312 is coupled to a respective one of the filters 314 at a respective input connection, and is coupled to the switching module 306 at a respective output connection. The switching module 306 is coupled to each of the LNAs 312, and is coupled to the first output 308 and to the second output 310. The outputs 308, 310 are each coupled to the switching module 306, and are each configured to be coupled to a transceiver, such as the transceiver 108.

The receive module 300 is similar to the receive module 200. However, whereas the receive module 200 includes the ASM 206, the receive module 300 does not include an ASM. Furthermore, whereas the receive module 200 includes the first antenna input 202 and the second antenna input 204, the receive module 300 includes only the antenna input 302. In the receive module 300, the signal paths 304 are coupled directly in parallel (or "ganged" together) between the switching module 306 and the antenna input 302. Accordingly, receive signals received at the antenna input (including, for example, mid-band and high-band signals from one or more antennas) may be provided to all of the signal paths 304.

As discussed above, two or more communication bands may be considered overlapping or non-overlapping. Non-overlapping communication bands may include communication bands spanning frequency ranges that do not overlap with other communication bands' frequency ranges. For example, the B8 communication band (925-960 MHz) may be considered to not overlap with the B26 communication band (859-894 MHz), because the communication bands' frequency ranges do not overlap one another. Conversely, the B7 communication band (2620-2690 MHz) may be considered to overlap the B41 communication band (2496-2690 MHz) because the communication bands' frequency ranges overlap at frequencies of 2620-2690 MHz. The B3 communication band (1805-1880 MHz) and the B39 communication band (1880-1920 MHz) may also be considered overlapping because the communication bands share a common band edge of 1880 MHz.

In various examples, each of the signal paths 304 corresponds to different, non-overlapping communication bands. Each of the filters 314 may include a bandpass filter or other type of filter configured to pass only signals having a frequency within the communication band to which the respective filter corresponds. For example, if the first signal path 304a corresponds to the B8 communication band, the first filter 314a may include a bandpass filter configured to pass signals having a frequency of approximately 925-960 MHz. Although the receive module 300 may not include an ASM, the filters 314 may ensure that a receive signal is passed only by an appropriate signal path. For example, although a receive signal in the B8 communication band received at the antenna input 302 may be provided to all of the filters 314, only the first filter 314*a* may pass the receive signal since only the first filter 314*a* may have a passband within which the receive signal falls. The remaining filters 314*b*-314*d* may filter out the receive signal rather than providing the receive signal to the LNAs 312*b*-312*d*.

Accordingly, the signal paths 304 may be effectively ganged together at least where the signal paths correspond to non-overlapping frequency ranges. By ganging the signal paths 304 together in parallel, an ASM may be omitted from the switching module 300, which improves performance and increases an amount of available die area.

The communication bands that a receive module is configured to support often varies by an area in which a communication device containing the receive module is used and/or may depend on a service provider for the communication device. For example, in areas of China, a receive module of a mobile communication device may be designed to support the B1, B3, B7, B8, B26, B34, B39, B40, and B41 communication bands. Conversely, in areas of India, a receive module of a mobile communication device may be designed to support the B1, B3, B8, B26, B40, and B41 communication bands. Accordingly, ganging signal paths together may be more desirable for some mobile communication devices (for example, devices supporting only non-overlapping communication bands) than other mobile communication devices (for example, devices supporting some overlapping communication bands).

In some examples, however, non-overlapping signal paths may be ganged together while other signal paths which would otherwise be overlapping may be switchable. Receive signals provided to the ganged signal paths may therefore avoid in-line insertion loss, and, because fewer than all of the signal paths may be switchable, less die area is consumed by switching devices.

Figure 4:
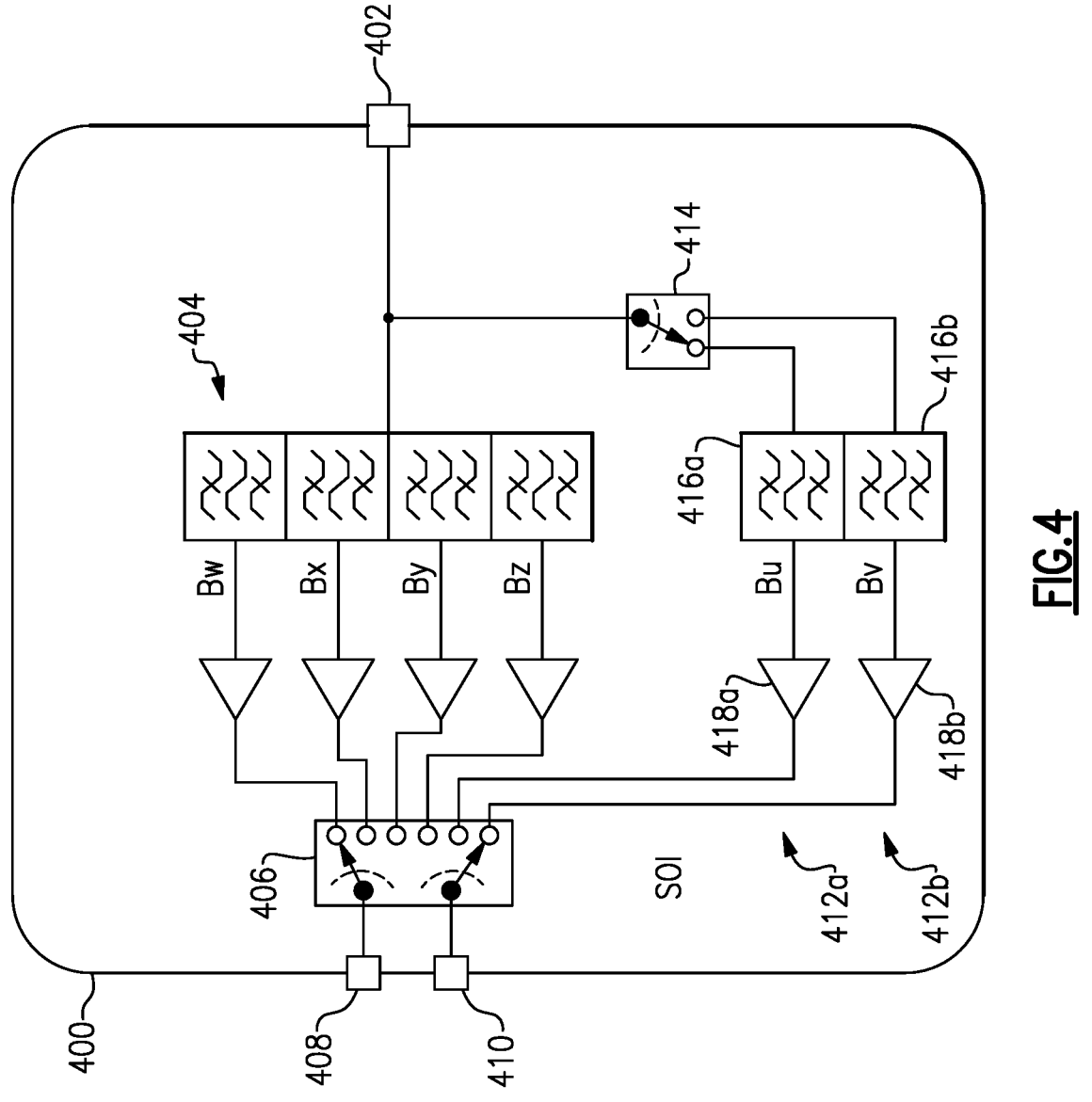
FIG. 4 illustrates a schematic diagram of a receive module according to a third example.

FIG. 4 illustrates a receive module 400 according to an example. For example, the receive module 400 may be an example of the receive module 114. The receive module 400 includes an antenna input 402, a plurality of ganged signal paths 404, a first switching device 406, a first output 408, a second output 410, a first non-ganged signal path 412*a* and a second non-ganged signal path 412*b* (collectively, "non-ganged signal paths 412"), and a second switching module 414. The first non-ganged signal path 412*a* includes a first filter 416*a* and a first LNA 418*a*. The second non-ganged signal path 412*b* includes a second filter 416*b* and a second LNA 418*b*.

The components 402-410 may be substantially similar or identical to the components 302-310, respectively, and subcomponents and connections thereof are not repeated for purposes of brevity. In addition, the non-ganged signal paths 412 and second switching module 414 are coupled between the antenna input 402 and the first switching device 406. The second switching module 414 is coupled to the antenna input 402 at an input, is coupled to the first filter 416*a* at a first output, and is coupled to the second filter 416*b* at a second output. The first filter 416*a* is coupled to the second switching module 414 at an input and is coupled to the first LNA 418*a* at an output. The second filter 416*b* is coupled to the second switching module 414 at an input and is coupled to the second LNA 418*b* at an output. The first LNA 418*a* is coupled to the first filter 416*a* at an input, and is coupled to the first switching device 406 at an output. The second LNA 418*b* is coupled to the second filter 416*b* at an input, and is coupled to the first switching device 406 at an output. The first switching device 406 is coupled to each ganged signal path of the plurality of ganged signal paths 404 (for example, to a respective LNA of each ganged signal path), the first LNA 418*a*, and the second LNA 418*b* at a respective input connection, is coupled to the first output 408 at a first output connection, and is coupled to the second output 410 at a second output connection.

A receive signal received at the antenna input 402 may be provided to the plurality of ganged signal paths 404 in a substantially identical manner as discussed above with respect to the signal paths 304 of the receive module 300. The receive signal may additionally be provided to the second switching module 414. The second switching module 414 may optionally provide the receive signal to one of or neither of the non-ganged signal paths 412. In some examples, the non-ganged signal paths 412 may correspond to communication bands having overlapping frequency ranges.

For example, the first non-ganged signal path 412*a* may correspond to the B7 communication band (2620-2690 MHz) and the second non-ganged signal path 412*b* may correspond to the B41 communication band (2496-2690 MHz), which may overlap one another but may not overlap a communication band of any signal path of the plurality of ganged signal paths 404. If a receive signal in the B7 communication band is received at the antenna input 402, the second switching module 414 may switchably connect the first non-ganged signal path 412*a* to the antenna input 402. The B7 receive signal may be provided to the first non-ganged signal path 412*a* via the second switching module 414 and to the plurality of ganged signal paths 404. However, the B7 receive signal may not be provided to the second non-ganged signal path 412*b* because the second switching module 414 does not switchably connect the antenna input 402 to the second non-ganged signal path 412*b*.

As noted above, each signal path of the plurality of ganged signal paths 404 may not overlap with the B7 communication band. Accordingly, although the B7 receive signal is provided to the plurality of ganged signal paths 404, each signal path of the plurality of signal paths 404 may filter out the B7 receive signal. Conversely, the first filter 416*a* may have a passband corresponding to the B7 receive signal and may pass the B7 receive signal to the first LNA 418*a*. In summary, the plurality of ganged signal paths 404 may include all non-overlapping signal paths, and the second switching module 414 may switchably connect the antenna input 402 to any of an arbitrary number of overlapping signal paths.

Although two overlapping signal paths are provided for purposes of example, the principles of the disclosure are applicable to any arbitrary number of overlapping signal paths. Furthermore, although each output of the second switching module 414 is coupled to a single signal path, in other examples one or more outputs of the second switching module 414 may be connected to two or more signal paths. For example, a first output of the second switching module 414 may be coupled to two signal paths that do not overlap with each other, but that do overlap with a third signal path coupled to a second output of the second switching module 414.

In some examples, a receive module may include a single antenna input coupled to multiple antennas. For example, the antenna input 402 may be coupled to multiple antennas including a mid-band antenna and a high-band antenna. In other examples, a receive module may include multiple antenna inputs each coupled to one or more antennas. For example, a receive module may include a first antenna input coupled to a low-band antenna, and a second antenna input coupled to a mid-band antenna and a high-band antenna.

Examples discussed herein may be applicable to receive modules, such as DRx modules. Principles of the disclosure are also applicable to transmit modules, such as PAiD modules. Although a transmit module may receive transmit signals from a transceiver to provide to an antenna—whereas a receive module may receive signals from an antenna to provide to a transceiver—transmit modules may similarly include multiple signal paths which may be ganged together (for example, multiple non-overlapping signal paths) and which may be switchably coupled to one or more additional signal paths (for example, overlapping signal paths). Accordingly, the principles discussed above with respect to receive modules may also be applicable to transmit modules.

As noted above, communication devices may use different communication bands in different areas of the world. For example, the communication bands used by communication devices in China may differ from the communication bands used by communication devices in India. Accordingly, signal paths may be coupled differently in different areas of the world. Certain examples are provided below for purposes of illustration, but the principles of the disclosure are applicable to various combinations of communication bands which may not be specifically illustrated.

Figure 5:
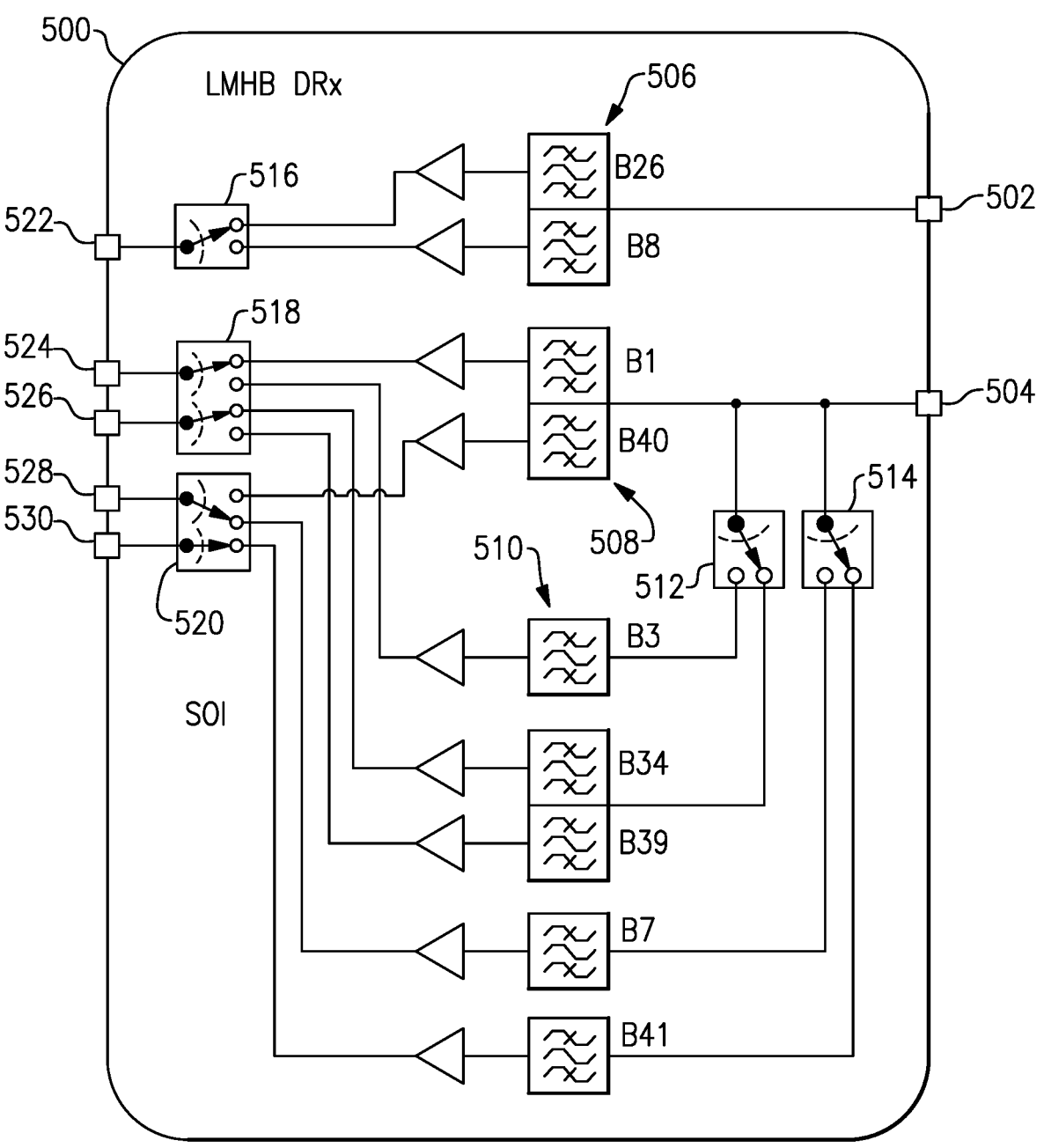
FIG. 5 illustrates a schematic diagram of a receive module according to a fourth example.

FIG. 5 illustrates a schematic diagram of a receive module 500 according to an example. As discussed above, different communication bands may be utilized in different areas of the world. In one example, the receive module 500 may provide an example of a low-, mid-, and high-band DRx module as may be used in certain areas of China in which the B1, B3, B7, B8, B26, B34, B39, B40, and B41 communication bands are utilized.

The receive module 500 includes a first antenna input 502, a second antenna input 504, a first group of signal paths 506, a second group of signal paths 508, a third group of signal paths 510, a first input switching module 512, a second input switching module 514, a first output switching module 516, a second output switching module 518, a third output switching module 520, a first output 522, a second output 524, a third output 526, a fourth output 528, and a fifth output 530.

The first antenna input 502 is coupled to the first group of signal paths 506, and is configured to be coupled to an antenna. For example, the first antenna input 502 may be coupled to a low-band antenna. The second antenna input 504 is coupled to the second group of signal paths 508, the first input switching module 512, and the second input switching module 514, and may be coupled to an antenna. For example, the second antenna input 504 may be coupled to a mid- and/or high-band antenna.

The first group of signal paths 506 is coupled to the first antenna input 502 at a first connection, and to the first output switching module 516 at respective second connections. For example, the first group of signal paths 506 may include two ganged signal paths corresponding to the B8 and B26 communication bands, and each may include a respective filter and LNA as discussed above.

The second group of signal paths 508 is coupled to the second antenna input 504 at a first connection, and to the second output switching module 518 and the third output switching module 520 at respective second connections. For example, the second group of signal paths 508 may include two ganged signal paths corresponding to the B1 and B40 communication bands, and each may include a respective filter and LNA as discussed above.

The third group of signal paths 510 is coupled to the second antenna input 504 via the first input switching module 512 and the second input switching module 514 at a first connection, and to the second output switching module 518 and the third output switching module 520 at respective second connections. For example, the third group of signal paths 510 may include a first signal path corresponding to the B3 communication band and being coupled between the first input switching module 512 and the second output switching module 518, a pair of ganged signal paths corresponding to the B34 and B39 communication bands and being coupled between the first input switching module 512 and the second output switching module 518, a second signal path corresponding to the B7 communication band and being coupled between the second input switching module 514 and the third output switching module 520, and a third signal path corresponding to the B41 communication band and being coupled between the second input switching module 514 and the third output switching module 520.

The first input switching module 512 includes an input coupled to the second antenna input 504, and first and second outputs coupled to the third group of signal paths 510. For example, the first output may be coupled to the B3 signal path, and the second output may be coupled to the ganged B34 and B39 signal paths. The second input switching module 514 includes an input coupled to the second antenna input 504, and first and second outputs coupled to the third group of signal paths 510. For example, the first output may be coupled to the B7 signal path, and the second output may be coupled to the B41 signal path.

The first output switching module 516 is coupled to the first group of signal paths 506 at a first and second input, and is coupled to the first output 522 at an output connection. For example, the first input may be coupled to the B26 signal path, and the second input may be coupled to the B8 signal path. The first output switching module 516 may include a single-pole, double-throw (SPDT) switch configured to switchably couple the first output 522 to either the B8 or B26 signal path of the first group of signal paths 506.

The second output switching module 518 is coupled to the second group of signal paths 508 and to the third group of signal paths 510 at first, second, third, and fourth inputs, and is coupled to the second output 524 and the third output 526 at a first output and a second output, respectively. For example, the second output switching module 518 may be coupled to the B1 signal path at the first input, the B3 signal path at the second input, the B34 signal path at the third input, the B39 signal path at the fourth input, the second output 524 at the first output, and to the third output 526 at the second output. The second output switching module 518 may include a first SPDT switch configured to switchably couple the second output 524 to one of the B1 signal path of the second group of signal paths 508 or the B3 signal path of the third group of signal paths 510, and a second SPDT switch configured to switchably couple the third output 526 to one of the B34 signal path or the B39 signal path of the third group of signal paths 510.

The third output switching module 520 is coupled to the second group of signal paths 508 and to the third group of signal paths 510 at first, second, and third inputs, and is coupled to the fourth output 528 and the fifth output 530 at first and second outputs, respectively. For example, the third output switching module 520 may be coupled to the B40 signal path at the first input, the B7 signal path at the second input, the B41 signal path at the third input, the fourth output 528 at the first output, and to the fifth output 530 at the second output. The third output switching module 520 may include a SPDT switch configured to switchably couple the fourth output 528 to one of the B40 signal path of the second group of signal paths 508 or the B7 signal path of the third group of signal paths 510, and a single-pole, single-throw switch configured to switchably couple (and/or decouple) the B41 communication path of the third group of signal paths 510 to the fifth output 530.

The first output 522 is coupled to the first output switching module 516 and is configured to be coupled to a transceiver. The second output 524 is coupled to the second output switching module 518 and is configured to be coupled to a transceiver. The third output 526 is coupled to the second output switching module 518 and is configured to be coupled to a transceiver. The fourth output 528 is coupled to the third output switching module 520 and is configured to be coupled to a transceiver. The fifth output 530 is coupled to the third output switching module 520 and is configured to be coupled to a transceiver.

Similar to the receive modules discussed above, the receive module 500 receives receive signals (for example, from one or more antennas) at the first antenna input 502 and/or the second antenna input 504. For example, the first antenna input 502 may receive low-band receive signals (for example, B8 and/or B26 signals) from a low-band antenna, and the second antenna input 504 may receive mid-band and/or high-band receive signals (for example, B1, B3, B7, B34, B39, B40, and/or B41 receive signals) from a mid-band and/or high-band antenna, which may include one antenna or two or more antennas.

Low-band receive signals may be provided directly to the first group of signal paths 506. The first group of signal paths 506 may include a B8 signal path and a B26 signal path ganged together because, for example, the B8 communication band does not overlap with the B26 communication band. Accordingly, low-band receive signals may be provided directly to the first group of signal paths 506.

Mid-band and/or high-band receive signals may be provided directly to the second group of signal paths 508 including the B1 and B40 signal path, and may be provided to the first input switching module 512 and the second input switching module 514. The first input switching module 512 may route receive signals to the B3 signal path or the B34-and-B39 ganged signal paths, or neither, and the second input switching module 514 may route receive signals to the B7 signal path or the B41 signal path, or neither. Neither the B1 nor B40 communication bands overlaps with any of communication bands corresponding to the third group of signal paths 510 such that receive signals received at the second antenna input 504 may be provided directly to the second group of signal paths 508.

Conversely, the first input switching module 512 may ensure that receive signals are provided only to either the B3 signal path or the B34-and-B39 ganged signal paths, because the B3 communication band overlaps the B39 communication path. Similarly, the second input switching module 514 may ensure that receive signals are provided only to either the B7 signal path or the B41 signal path, because the B7 communication band overlaps the B41 communication path. If a receive signal is received at the second antenna input 504 which does not correspond to any signal path in the third group of signal paths 510 (for example, because the receive signal is a B1 or B40 receive signal and thus corresponds to the second group of signal paths 508), the switching modules 512, 514 may disconnect the third group of signal paths 510 from the second antenna input 504, or may couple the second antenna input 504 to a signal path which does not overlap the receive signal (or to several ganged signal paths, none of which overlaps the receive signal).

If a receive signal is received at the second antenna input 504 which corresponds to the B3 communication band or the B34 or B39 communication band, then the first input switching module 512 may route the receive signal to the B3 signal path or the B34-and-B39 ganged signal path, respectively. Similarly, if a receive signal is received at the second antenna input 504 which corresponds to the B7 communication band or the B41 communication band, then the second input switching module 514 may route the receive signal to the B7 signal path or the B41 signal path, respectively.

Accordingly, the receive module 500 may route receive signals to appropriate signal paths. Receive signals in the B1, B8, B26, and B40 communication bands may be provided directly to respective signal paths, thereby avoiding insertion loss that might otherwise be introduced by an ASM between an antenna input and the signal path. Although the input switching modules 512, 514 may be implemented to route receive signals to the B3, B7, B34, B39, and B41 communication bands, a size of the switching modules 512, 514 may be smaller than existing ASMs since fewer switching connections may be implemented (for example, because the first group of signal paths 506 and the second group of signal paths 508 do not require switching connections). The receive module 500 may therefore provide an improved DRx module for low-, mid-, and high-band communication for communication devices supporting B1, B3, B7, B8, B26, B34, B39, B40, and B41 communication bands, which may be in use in geographical regions such as China.

Figure 6:
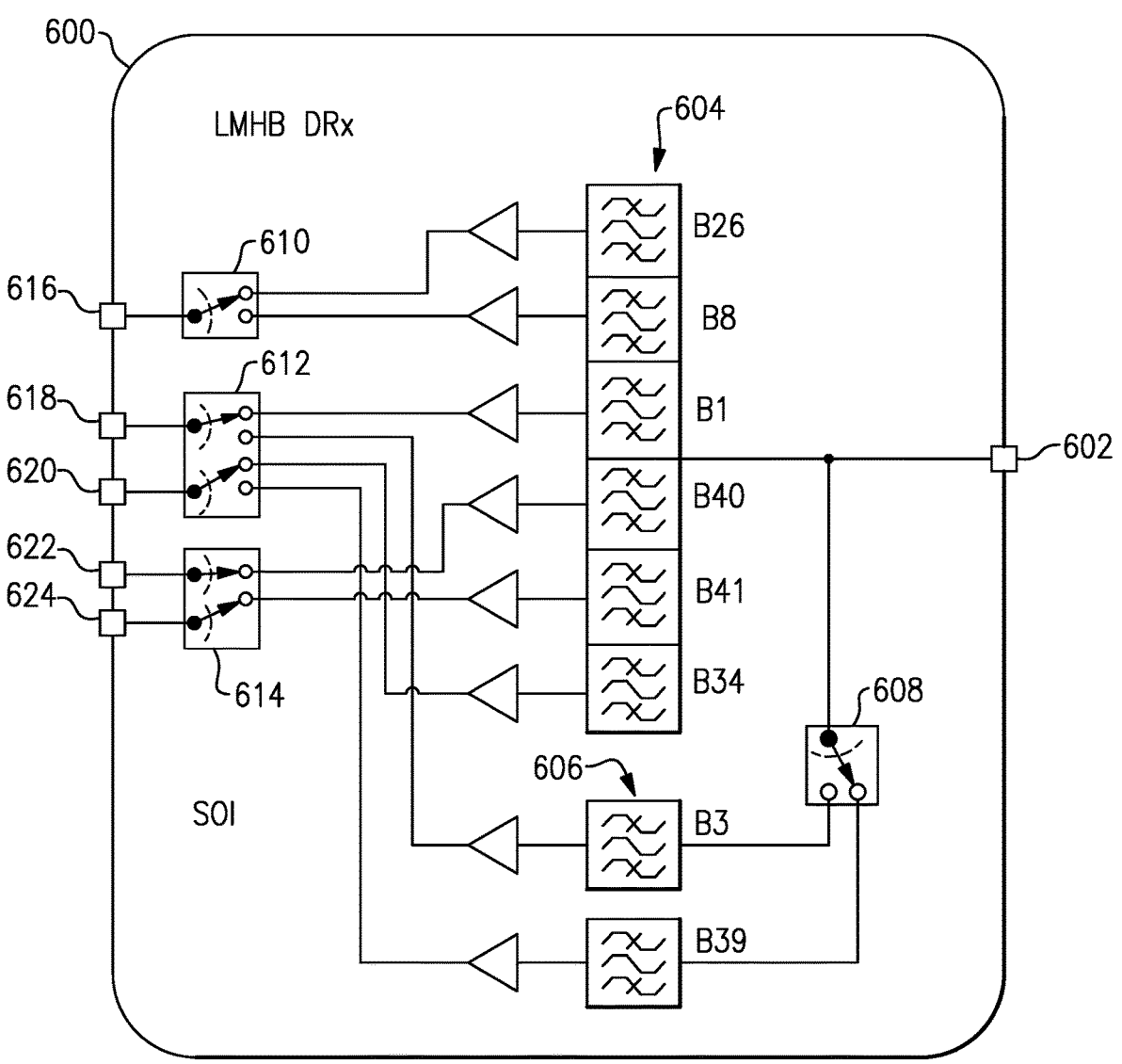
FIG. 6 illustrates a schematic diagram of a receive module according to a fifth example.

In various examples, modifications may be made to the receive module 500. FIG. 6 illustrates a schematic diagram of a receive module 600 according to an example. The receive module 600 includes an antenna input 602, a first group of signal paths 604, a second group of signal paths 606, an input switching module 608, a first output switching module 610, a second output switching module 612, a third output switching module 614, a first output 616, a second output 618, a third output 620, a fourth output 622, and a fifth output 624.

The antenna input 602 is coupled to the first group of signal paths 604 and the input switching module 608, and is configured to be coupled to one or more antennas that may provide low-, mid-, and/or high-band signals. The first group of signal paths 604 is coupled to the antenna input 602 at a first connection, and to the first output switching module 610, the second output switching module 612, and the third output switching module 614 at respective second connections. For example, the first group of signal paths 604 may include six ganged signal paths corresponding to the B1, B8, B26, B34, B40, and B41 communication bands, and each may include a respective filter and LNA as discussed above.

The second group of signal paths 606 is coupled to the input switching module 608 at respective first connections, and to the second output switching module 612 at respective second connections. For example, the second group of signal paths 606 may include a B3 signal path and a B39 signal path. The input switching module 608 is coupled to the antenna input 602 at a first connection, and to the second group of signal paths 606 at respective second connections. For example, the input switching module 608 may include a SPDT switch configured to switchably connect the antenna input 602 to one of the B3 signal path or the B39 signal path.

The first output switching module 610 is coupled to the first group of signal paths 604 at respective first connections, and is coupled to the first output 616 at a second connection. For example, the first output switching module 610 may include a SPDT switch configured to switchably couple the first output 616 to one of the B8 signal path or the B26 signal path.

The second output switching module 612 is coupled to the first group of signal paths 604 and the second group of signal paths 606 at respective first connections, and is coupled to the second output 618 and the third output 620 at respective second connections. For example, the second output switching module 612 may include a first SPDT switch configured to switchably couple the second output 618 to one of the B1 or the B3 signal path, and a second SPDT switch configured to switchably couple the third output 620 to one of the B34 or B39 signal path.

The third output switching module 614 is coupled to the first group of signal paths 604 at respective first connections, and is coupled to the fourth output 622 and the fifth output 624 at respective second connections. For example, the third output switching module 614 may include a SPST switch configured to switchably couple (or decouple) the B40 signal path from the fourth output 622, and a SPST switch configured to switchably couple (or decouple) the B41 signal path from the fifth output 624.

The first output 616 is coupled to the first output switching module 610, and is configured to be coupled to a transceiver. The second output 618 is coupled to the second output switching module 612, and is configured to be coupled to a transceiver. The third output 620 is coupled to the second output switching module 612, and is configured to be coupled to a transceiver. The fourth output 622 is coupled to the third output switching module 614, and is configured to be coupled to a transceiver. The fifth output 624 is coupled to the third output switching module 614, and is configured to be coupled to a transceiver.

The receive module 600 is similar to the receive module 500 and supports the same communication bands as the receive module 500, except for the B7 communication band. Unlike the receive module 500, which includes two antenna inputs 502, 504, the receive module 600 includes a single antenna input 602. Reducing a number of antenna connections may reduce a size, cost, and/or complexity of the receive module 600. The antenna input 602 may still be coupled to one or more low-, mid-, and/or high-band antennas configured to provide the same or similar receive signals to the receive module 600 as would be provided to the receive module 500. Furthermore, in the receive module 600, only one input switching module 608 is implemented, which may further reduce a size, cost, and/or complexity of the receive module 600.

Figure 7:
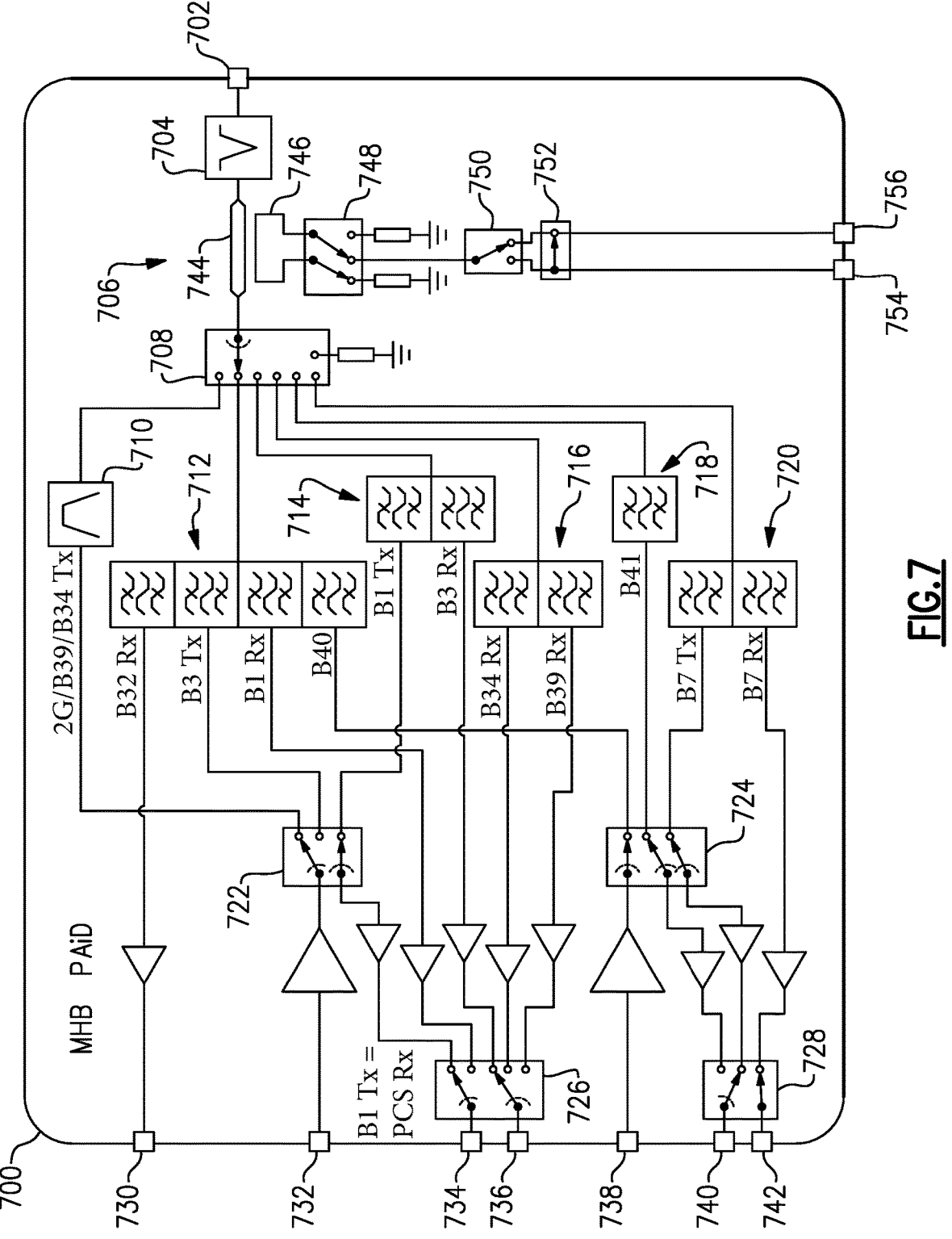
FIG. 7 illustrates a schematic diagram of a transmit module according to a first example.

As discussed above, although the principles discussed above may be applied to receive modules (for example, DRx modules), the principles discussed above may also be applied to transmit modules, such as PAiD modules, which may be capable of transmitting and receiving signals. FIG. 7 illustrates a schematic diagram of a transmit module 700 according to an example. The transmit module 700 may provide an example of the transmit module 112 and/or the receive module 114 or a component thereof. For example, the transmit module 700 may be a first PAiD, and the transmit module 112 and/or the receive module 114 may include several PAiDs, such as a mid- and high-band PAiD and a low-band PAiD. In some examples, the transmit module 700 provides an example of a mid- and high-band PAiD. In various examples, the transmit module 700 may support communication bands in use in geographical areas including China.

The transmit module 700 includes an antenna connection 702, a first filter 704, a coupler section 706, a first switching module 708, a second filter 710, a first group of signal paths 712, a second group of signal paths 714, a third group of signal paths 716, a fourth group of signal paths 718, a fifth group of signal paths 720, a second switching module 722, a third switching module 724, a fourth switching module 726, a fifth switching module 728, a first receive connection 730, a first transmit connection 732, a second receive connection 734, a third receive connection 736, a second transmit connection 738, a fourth receive connection 740, and a fifth receive connection 742. The coupler section 706 includes a transmission line 744, a coupled line 746, a sixth switching module 748, a seventh switching module 750, an eighth switching module 752, a first coupler connection 754, and a second coupler connection 756.

The antenna connection 702 is coupled to the first filter 704 and is configured to be coupled to at least one antenna. For example, the antenna connection 702 may be configured to be coupled to at least one low-, mid-, and/or high-band antenna. The first filter 704 is coupled to the antenna connection 702 at a first connection, and is coupled to the first switching module 708 via the transmission line 744 at a second connection. The first switching module 708 is coupled to the first filter 704 via the transmission line 744 at a first connection, and is switchably coupled to the second filter 710, the first group of signal paths 712, the second group of signal paths 714, the third group of signal paths 716, the fourth group of signal paths 718, and the fifth group of signal paths 720 at respective second connections.

The second filter 710 is coupled to the first switching module 708 at a first connection, and is coupled to the second switching module 722 at a second connection. The first group of signal paths 712 is coupled to the first switching module 708 at a first connection, and is coupled to the first receive connection 730, the second switching module 722, the fourth switching module 726, and the third switching module 724 at respective second connections. For example, the first group of signal paths 712 may include a B32 receive ("Rx") signal path including a filter and an LNA coupled to the first receive connection 730, a B3 transmit ("Tx") signal path including a filter switchably coupled to a PA via the fourth switching module 726, the PA being coupled to the first transmit connection 732, a B1 Rx signal path including a filter and an LNA switchably coupled to the second receive connection 734 via the fourth switching module 726, and a B40 signal path including a filter switchably coupled via the third switching module 724 to either a PA being coupled to the second transmit connection 738 or an LNA being coupled to the fifth switching module 728, which may couple the LNA to the fourth receive connection 740. In various examples, the first group of signal paths 712 includes ganged B32 Rx, B3 Tx, B1 Rx, and B40 signal paths.

The second group of signal paths 714 is coupled to the first switching module 708 at a first connection, and is coupled to the second switching module 722 and the fourth switching module 726 at respective second connections. For example, the second group of signal paths 714 may include a B1 Tx signal path including a filter switchably coupled to a PA via the second switching module 722, the PA being coupled to the first transmit connection 732, and a B3 Rx signal path including a filter coupled to an LNA, the LNA being switchably coupled to the third receive connection 736 via the fourth switching module 726. In various examples, the second group of signal paths 714 includes ganged B1 Rx and B3 Rx signal paths.

The third group of signal paths 716 is coupled to the first switching module 708 at a first connection, and is coupled to the fourth switching module 726 at respective second connections. For example, the third group of signal paths 716 may include a B34 Rx signal path including a filter coupled to an LNA, the LNA being switchably coupled to the third receive connection 736 via the fourth switching module 726, and a B39 Rx signal path including a filter coupled to an LNA the LNA being switchably coupled to the third receive connection 736 via the fourth switching module 726. In various examples, the third group of signal paths 716 includes ganged B34 Rx and B39 Rx signal paths.

The fourth group of signal paths 718 is coupled to the first switching module 708 at a first connection, and is coupled to the third switching module 724 at a second connection. For example, the fourth group of signal paths 718 may include a B41 signal path including a filter switchably coupled via the third switching module 724 to either a PA, which may be coupled to the second transmit connection 738, or an LNA, which may be switchably coupled to the fourth receive connection 740 via the fifth switching module 728.

The fifth group of signal paths 720 is coupled to the first switching module 708 at a first connection, and is coupled to the third switching module 724 and the fifth switching module 728 at respective second connections. For example, the fifth group of signal paths 720 may include a B7 Tx signal path including a filter switchably coupled to a PA via the third switching module 724, the PA being coupled to the second transmit connection 738, and a B7 Rx signal path including a filter coupled to an LNA, the LNA being switchably coupled to the fifth receive connection 742 via the fifth switching module 728. In various examples, the fifth group of signal paths 720 includes ganged B37 Tx and B37 Rx signal paths.

The second switching module 722 includes a first connection coupled to the first transmit connection 732 via a PA and a second connection coupled to the fourth switching module 726 via an LNA, the first and second connections being switchably coupled to any of a third connection coupled to the second filter 710, a fourth connection coupled to the B3 transmit filter of the first group of signal paths 712, and a fifth connection coupled to the B1 transmit filter of the second group of signal paths 714. Accordingly, certain components (for example, the PA) may be shared amongst different signal paths by switchably coupling the PA to different transmit filters at different times, such as the second filter 710, the B3 Tx filter, and/or the B1 Tx filter.

The third switching module 724 includes a first connection coupled to the second transmit connection 738 via a PA, a second connection coupled to a first LNA which is switchably coupled to the fourth receive connection 740 via the fifth switching module 728, and a third connection coupled to a second LNA which is switchably coupled to the fifth receive connection 742 via the fifth switching module 728, the first, second, and third connections being switchably coupled to any of a fourth connection coupled to the B40 filter, a fifth connection coupled to the B41 filter, and a sixth connection coupled to the B7 Tx filter.

The fourth switching module 726 includes a first connection coupled to the second receive connection 734 and a second connection coupled to the third receive connection 736, the first and second connections being switchably coupled to any of a third connection coupled to the second switching module 722 via a first LNA, a fourth connection coupled to the B1 Rx filter via a second LNA, a fifth connection coupled to the B3 Rx filter via a third LNA, a sixth connection coupled to the B34 Rx filter via a fourth LNA, and a seventh connection coupled to the B39 Rx filter via a fifth LNA.

The fifth switching module 728 includes a first connection coupled to the fourth receive connection 740 and a second connection coupled to the fifth receive connection 742, the first and second connections being switchably coupled to any of a third connection coupled to the second connection of the third switching module 724 via a first LNA, a fourth connection coupled to the third connection of the third switching module 724 via a second LNA, and a fifth connection coupled to the B7 Rx filter via a third LNA.

The first receive connection 730 is coupled to the B32 Rx filter via an LNA, and is configured to be coupled to a transceiver. The first transmit connection 732 is coupled to the second switching module 722 via a PA, and is configured to be coupled to a transceiver. The second receive connection 734 is coupled to the first connection of the fourth switching module 726, and is configured to be coupled to a transceiver. The third receive connection 736 is coupled to the second connection of the fourth switching module 726, and is configured to be coupled to a transceiver. The second transmit connection 738 is coupled to the first connection of the third switching module 724 via a PA, and is configured to be coupled to a transceiver. The fourth receive connection 740 is coupled to the first connection of the fifth switching module 728, and is configured to be coupled to a transceiver. The fifth receive connection 742 is coupled to the second connection of the fifth switching module 728, and is configured to be coupled to a transceiver.

The coupled line 746 is wirelessly coupled to the transmission line 744, and is coupled to the sixth switching module 748 at a first connection and at a second connection. The sixth switching module 748 includes a first connection coupled to the first connection of the coupled line 746 and a second connection coupled to the second connection of the coupled line, the first and second connections being switchably coupled to any of a third connection coupled to the seventh switching module 750, a fourth connection coupled to a first reference node (for example, a neutral node) via a first load, and a fifth connection coupled to a second reference node (for example, the neutral node) via a second load.

The seventh switching module 750 includes a first connection coupled to the third connection of the sixth switching module 748, the first connection being switchably coupled to either of a second connection coupled to the eighth switching module 752 and a third connection coupled to the eighth switching module 752. The eighth switching module 752 includes a first connection coupled to the second connection of the seventh switching module 750 and to the first coupler connection 754, the first connection being switchably coupled to a second connection coupled to the third connection of the seventh switching module 750 and to the second coupler connection 756.

The first coupler connection 754 is coupled to the second connection of the seventh switching module 750 and to the first connection of the eighth switching module 752, and is configured to be coupled to a coupler or other coupler circuitry. The second coupler connection 756 is coupled to the third connection of the seventh switching module 750 and to the second connection of the eighth switching module 752, and is configured to be coupled to a coupler or other coupler circuitry.

The transmit module 700 is configured to transmit and/or receive signals. For example, the transmit module 700 may receive transmit signals at either of the transmit connections 732, 738 from a transceiver, route the transmit signal to an appropriate signal path, and provide the transmit signal to the antenna connection 702 to be provided to at least one antenna. The coupler section 706 may provide information indicative of the transmit signal conducted by the transmission line 744 to either or both of the coupler connections 754, 756. The first filter 704 may be a notch filter configured to filter transmit signals provided to the antenna connection 702.

Similarly, the transmit module 700 may receive signals at the antenna connection 702, route the receive signal to an appropriate signal path, and provide the receive signal to a corresponding one of the receive connections 730, 734, 736, 740, or 742 to be provided to the transceiver. The coupler section 706 may provide information indicative of the receive signal conducted by the transmission line 744 to either or both of the coupler connections 754, 756. The first filter 704 may be a notch filter configured to filter transmit signals received at the antenna connection 702. Accordingly, the transmit module 700 may be capable of both transmit and receive functionality.

Figure 8:
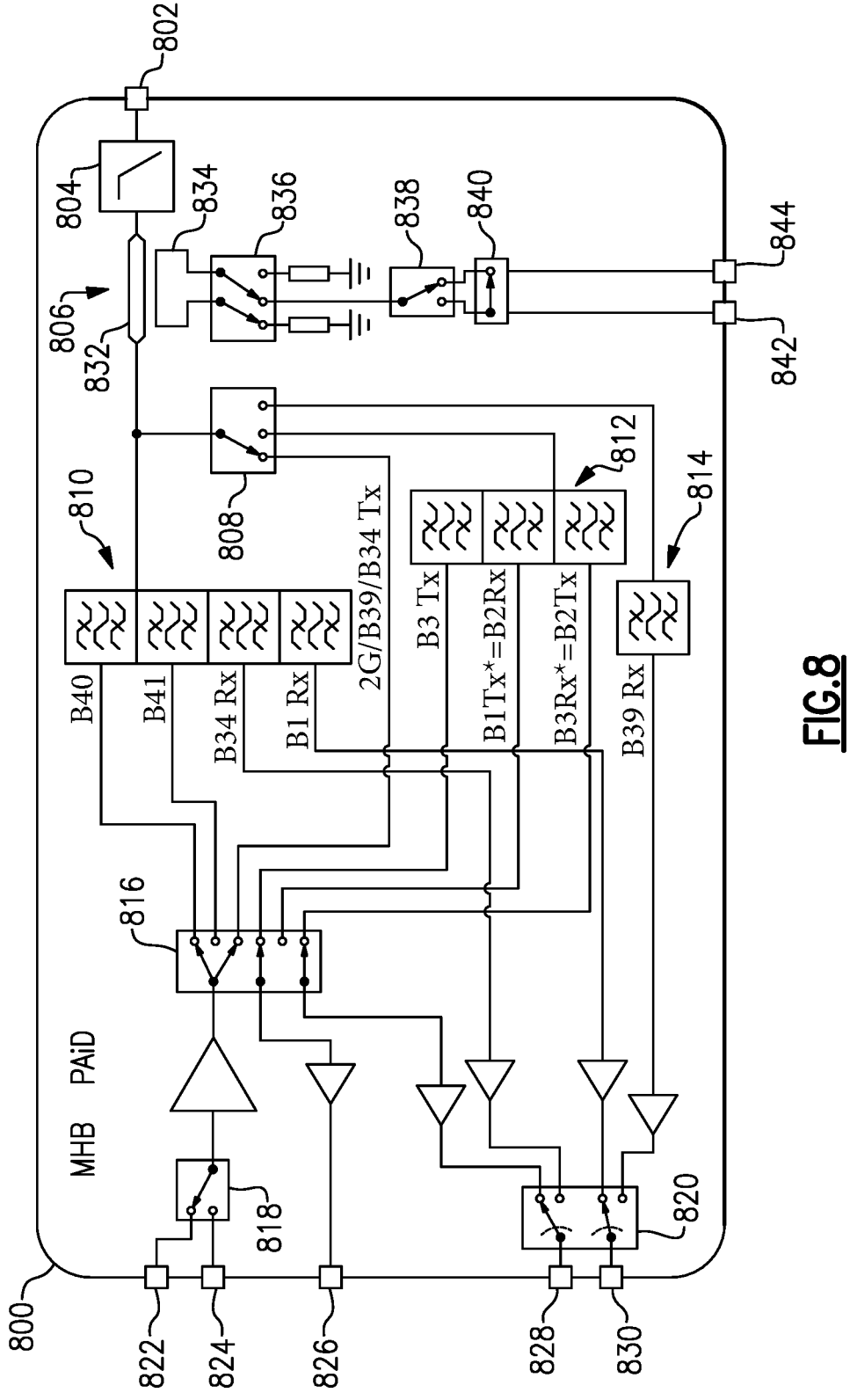
FIG. 8 illustrates a schematic diagram of a transmit module according to a second example.

Different configurations of transmit modules, such as PAiD modules supporting communication bands in use in geographical areas such as China, are within the scope of the disclosure. FIG. 8 illustrates a schematic diagram of a transmit module 800 according to an example. The transmit module 800 may be implemented as a PAiD and may provide an example of the transmit module 112 and/or the receive module 114, or a component thereof. For example, the transmit module 800 may be a first PAiD, and the transmit module 112 and/or the receive module 114 may include several PAiDs, such as a mid- and high-band PAiD and a low-band PAiD. In some examples, the transmit module 800 provides an example of a mid- and high-band PAiD. In various examples, the transmit module 800 may support communication bands in use in geographical areas including China.

The transmit module 800 includes an antenna connection 802, a filter 804, a coupler section 806, a first switching module 808, a first group of signal paths 810, a second group of signal paths 812, a third group of signal paths 814, a second switching module 816, a third switching module 818, a fourth switching module 820, a first transmit connection 822, a second transmit connection 824, a first receive connection 826, a second receive connection 828, and a third receive connection 830. The coupler section 806 includes a transmission line 832, a coupled line 834, a fifth switching module 836, a sixth switching module 838, a seventh switching module 840, a first coupler connection 842, and a second coupler connection 844.

The antenna connection 802 is coupled to the filter 804, and is configured to be coupled to at least one low-, mid-, and/or high-band antenna. The filter 804 is coupled to the antenna connection 802 at a first connection, and is coupled to the first switching module 808 and the first group of signal paths 810 via the transmission line 832 at a second connection. The first switching module 808 is coupled to the filter 804 via the transmission line 832 at a first connection, and is switchably coupled to any of a second connection switchably coupled to an LNA or a PA via the second switching module 816, the PA being switchably coupled to the first transmit connection 822 and the second transmit connection 824 and the LNA being switchably coupled to the first receive connection 826, a third connection coupled to the second group of signal paths 812, and a fourth connection coupled to the third group of signal paths 814.

The first group of signal paths 810 is coupled to the filter 804 via the transmission line 832 at a first connection, and is coupled to the second switching module 816 at respective second connections. For example, the first group of signal paths 810 may include a B40 signal path including a filter switchably coupled via the second switching module 816 to either an LNA or a PA, the PA being switchably coupled to the first transmit connection 822 and the second transmit connection 824 and the LNA being switchably coupled to the first receive connection 826, a B41 signal path including a filter switchably coupled via the second switching module 816 to either an LNA or a PA, the PA being switchably coupled to the first transmit connection 822 and the second transmit connection 824 and the LNA being switchably coupled to the first receive connection 826, a B34 Rx signal path including a B34 Rx filter and an LNA switchably coupled to the second receive connection 828 via the fourth switching module 820, and a B1 Rx signal path including a B1 Rx filter and an LNA switchably coupled to the third receive connection 830 via the fourth switching module 820. In various examples, the first group of signal paths 810 include the B40, B41, B34 Rx, and B1 Rx signal paths ganged together.

The second group of signal paths 812 is coupled to the third connection of the first switching module 808 at a first connection, and is coupled to the second switching module 816 at respective second connections. For example, the second group of signal paths 812 may include a B3 Tx signal path including a B3 Tx filter switchably coupled to a PA via the second switching module 816, the PA being switchably coupled to either the first transmit connection 822 or the second transmit connection 824 via the third switching module 818, a modified B1 Tx signal path including a modified B1 Tx filter switchably coupled to either a first LNA or a second LNA via the second switching module 816, the first LNA being coupled to the first receive connection 826 and the second LNA being switchably coupled to the second receive connection 828 via the fourth switching module 820, and a modified B3 Rx signal path including a modified B3 Rx filter switchably coupled to a PA via the second switching module 816, the PA being switchably coupled to either the first transmit connection 822 or the second transmit connection 824 via the third switching module 818. In some examples, the modified B1 Tx filter has a frequency range extended up to 1990 MHz and thereby acts as a B2 Rx filter. In some examples, the modified B3 Rx filter has a frequency range extended up to 1910 MHz and thereby acts as a B2 Tx filter. In various examples, the second group of signal paths 812 includes the B3 Tx, modified B1 Tx, and modified B3 Rx signal paths ganged together.

The third group of signal paths 814 is coupled to the fourth connection of the first switching module 808 at a first connection, an dis coupled to the fourth switching module 820 at a second connection. For example, the third group of signal paths 814 may include a B39 Rx signal path including a filter and an LNA, the LNA being switchably coupled to the third receive connection 830 via the fourth switching module 820.

The components 832-844 of the coupler section 806 may be configured in a substantially similar or identical manner to the components 744-756, respectively, of the coupler section 706, except that the transmission line 832 is coupled between the filter 804 and the first switching module 808 and the first group of signal paths 810. Accordingly, the connections of the components 832-844 are not repeated for purposes of brevity.

The transmit module 800 operates in a similar manner as the transmit module 700. Transmit signals may be received from a transceiver at either of the transmit connections 822, 824, routed to an appropriate signal path, and provided to an antenna via the antenna connection 802. The coupler section 806 may provide information indicative of the transmit signal conducted by the transmission line 832 to either or both of the coupler connections 842, 844. The filter 804 may be a low-pass filter configured to filter transmit signals provided to the antenna connection 802.

Receive signals may be received from an antenna at the antenna connection 802, routed to an appropriate signal path, and provided to a transceiver via a corresponding one of the receive connections 826-830. The coupler section 806 may provide information indicative of the receive signal conducted by the transmission line 832 to either or both of the coupler connections 842, 844. The filter 804 may be a low-pass filter configured to filter receive signals received from the antenna connection 802.

Figure 9:
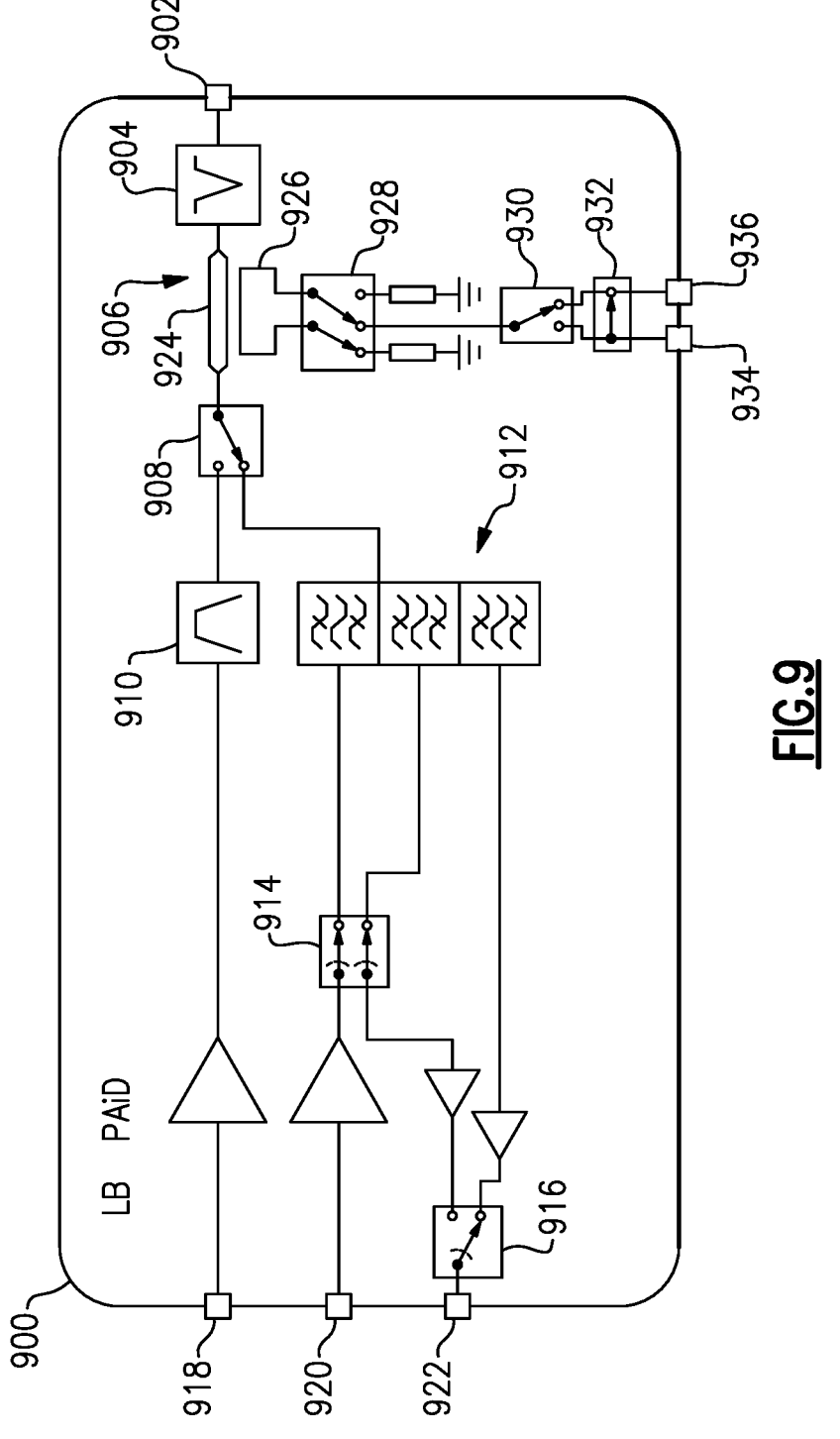
FIG. 9 illustrates a schematic diagram of a transmit module according to a third example.

As noted above, a communication device may include multiple PAiDs, each corresponding to one or more frequencies, such as a mid- and high-band PAiD and a low-band PAiD. FIG. 9 illustrates a schematic diagram of a transmit module 900 according to an example. The transmit module 900 may be implemented as a PAiD and may provide an example of the transmit module 112 and/or the receive module 114, or a component thereof. For example, the transmit module 900 may be a first PAiD, and the transmit module 112 and/or the receive module 114 may include several PAiDs, such as a mid- and high-band PAiD and a low-band PAiD. In some examples, the transmit module 900 provides an example of a low-band PAiD and could, for example, be implemented in conjunction with the transmit module 700 and/or the transmit module 800. In various examples, the transmit module 800 may support communication bands in use in geographical areas including China.

The transmit module 900 includes an antenna connection 902, a first filter 904, a coupler section 906, a first switching module 908, a second filter 910, a group of signal paths 912, a second switching module 914, a third switching module 916, a first transmit connection 918, a second transmit connection 920, and a receive connection 922. The coupler section 906 includes a transmission line 924, a coupled line 926, a fourth switching module 928, a fifth switching module 930, a sixth switching module 932, a first coupler connection 934, and a second coupler connection 936.

The antenna connection 902 is coupled to the first filter 904, and is configured to be coupled to at least one antenna. The first filter 904 is coupled to the antenna connection 902 at a first connection, and is coupled to the first switching module 908 via the transmission line 924 at a second connection. The first switching module 908 is coupled to the first filter 904 via the transmission line 924 at a first connection, the first connection being switchably coupled to a second connection coupled to the second filter 910 and to a third connection coupled to the group of signal paths 912.

The group of signal paths 912 is coupled to the first switching module 908 at a first connection, and is coupled to the second switching module 914 and the third switching module 916 at respective second connections. For example, the group of signal paths 912 may include a B26 Tx signal path including a filter switchably coupled to a PA via the second switching module 914, the PA being coupled to the second transmit connection 920, a B8-Tx-and-B26-Rx signal path including an overlapping B8-Tx-and-B26-Rx filter switchably coupled via the second switching module 914 to either a PA coupled to the second transmit connection 920 or an LNA switchably coupled to the receive connection 922 via the third switching module 916, and a B8 Rx signal path including a filter coupled to an LNA, the LNA being switchably coupled to the receive connection 922 via the third switching module 916.

The second switching module 914 is coupled to the second transmit connection 920 via a PA at a first connection and is coupled to the third switching module 916 via an LNA at a second connection, the first and second connections being switchably coupled to either a third connection coupled to the B26 Tx filter or a fourth connection coupled to the B8-Tx-and-B26-Rx filter.

The third switching module 916 is coupled to the receive connection 922 at a first connection, the first connection being switchably coupled to either a second connection coupled to the second connection of the second switching module 914 via a first LNA or to a third connection coupled to the B8 Rx filter via a second LNA.

The first transmit connection 918 is coupled to the second filter 910 via a PA, and is configured to be coupled to a transceiver. The second transmit connection 920 is coupled to the first connection of the second switching module 914 via a PA, and is configured to be coupled to a transceiver. The receive connection 922 is coupled to the first connection of the third switching module 916, and is configured to be couple to a transceiver.

In various examples, the components 924-936 of the coupler section 906 may be configured in a substantially similar or identical manner to the components 744-756, respectively, of the coupler section 706, except that the transmission line 924 is coupled between the first filter 904 and the first switching module 908. Accordingly, the connections of the components 924-936 are not repeated for purposes of brevity.

The transmit module 900 operates in a similar manner as the transmit modules 700, 800. In some examples, however, the transmit module 900 may process low-band and 2G signals, whereas the transmit modules 700, 800 may process mid- and high-band signals. Transmit signals may be received from a transceiver at either of the transmit connections 918, 920, routed to an appropriate signal path, and provided to an antenna via the antenna connection 902. The coupler section 906 may provide information indicative of the transmit signal conducted by the transmission line 924 to either or both of the coupler connections 934, 936. The first filter 904 may be a notch filter configured to filter transmit signals provided to the antenna connection 902.

Receive signals may be received from an antenna at the antenna connection 902, routed to an appropriate signal path, and provided to a transceiver via the receive connection 922. The coupler section 906 may provide information indicative of the receive signal conducted by the transmission line 924 to either or both of the coupler connections 934, 936. The first filter 904 may be a notch filter configured to filter receive signals received from the antenna connection 902.

Accordingly, various transmit modules, including the transmit modules 700, 800, 900, may be implemented in a communication device. One or more of the transmit modules 700, 800, 900 may be implemented as components of, and/or examples of, one or both of the modules 112, 114. For example, a communication device may include the transmit module 700 and/or 800 to process mid- and high-band signals, and may include the transmit module 900 to process low-band and 2G signals. Such a communication device may be implemented, for example, in geographical regions in which the communication bands supported by the transmit modules 700, 800, 900 are used, such as regions of China. As discussed above, communication devices in different geographical regions, such as India, may be implemented with different modules supporting different communication bands.

FIG. 10 illustrates a receive module 1000 according to an example. The receive module 1000 may be an example of the receive module 114 and may include a DRx module. In various examples, the receive module 1000 may be implemented in a region supporting receive signals in the B1, B3, B8, B26, B40, and B41 communication bands, such as regions of India.

The receive module 1000 includes an antenna connection 1002, a group of signal paths 1004, a first switching module 1006, a second switching module 1008, a third switching module 1010, a first receive connection 1012, a second receive connection 1014, a third receive connection 1016, a fourth receive connection 1018, and a fifth receive connection 1020.

The antenna connection 1002 is coupled to the group of signal paths 1004, and may be coupled to an antenna, such as at least one low-, mid-, and/or high-band antenna. The group of signal paths 1004 is coupled to the antenna connection 1002 at a first connection, and is coupled to each of the switching modules 1006-1010 at respective second connections. For example, the group of signal paths 1004 may include a B26 signal path including a filter and an LNA coupled to the first switching module 1006, a B8 signal path including a filter and an LNA coupled to the first switching module 1006, a B1 signal path including a filter and an LNA coupled to the second switching module 1008, a B3 signal path including a filter and an LNA coupled to the second switching module 1008, a B40 signal path including a filter and an LNA coupled to the third switching module 1010, and a B41 signal path including a filter and an LNA coupled to the third switching module 1010.

The first switching module 1006 includes a first connection coupled to the first receive connection 1012, the first connection being switchably coupled to a second connection coupled to the B26 filter via a first LNA and a third connection coupled to the B8 filter via a second LNA. The second switching module 1008 includes a first connection coupled to the second receive connection 1014 and a second connection coupled to the third receive connection 1016, the first and second connections being switchably coupled to either of a third connection coupled to the B1 filter via a first LNA or a fourth connection coupled to the B3 filter via a second LNA. The third switching module 1010 includes a first connection coupled to the fourth receive connection 1018 and a second connection coupled to the fifth receive connection 1020, the first and second connections being switchably coupled to either of a third connection coupled to the B40 filter via a first LNA or a fourth connection coupled to the B41 filter via a second LNA.

The first receive connection 1012 is coupled to the first connection of the first switching module 1006 and is configured to be coupled to a transceiver. The second receive connection 1014 is coupled to the first connection of the second switching module 1008 and is configured to be coupled to a transceiver. The third receive connection 1016 is coupled to the second connection of the second switching module 1008 and is configured to be coupled to a transceiver. The fourth receive connection 1018 is coupled to the first connection of the third switching module 1010 and is configured to be coupled to a transceiver. The fifth receive connection 1020 is coupled to the second connection of the third switching module 1010 and is configured to be coupled to a transceiver.

Receive signals may be received from an antenna at the antenna connection 1002, routed to an appropriate signal path, and provided to a transceiver via a corresponding one of the receive connections 1012-1020. For example, low-band signals may be provided to the first receive connection 1012, mid-band signals may be provided to the second receive connection 1014 or third receive connection 1016, and high-band signals may be provided to the fourth receive connection 1018 or the fifth receive connection 1020.

Figure 11:
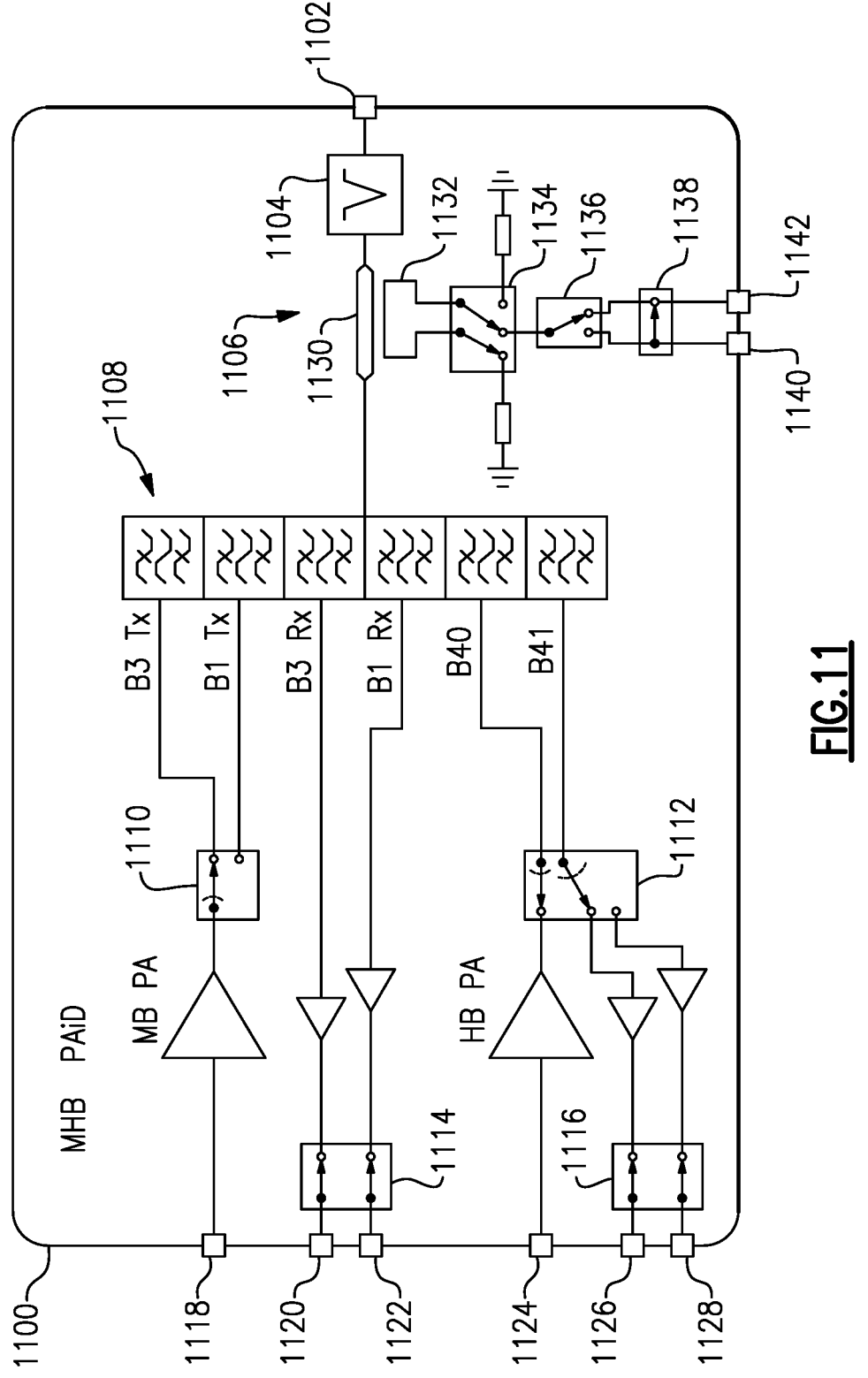
FIG. 11 illustrates a schematic diagram of a transmit module according to a fourth example.

As discussed above, although the principles discussed above may be applied to receive modules (for example, DRx modules), the principles discussed above may also be applied to transmit modules, such as PAiD modules, which may be capable of transmitting and receiving signals. FIG. 11 illustrates a schematic diagram of a transmit module 1100 according to an example. The transmit module 1100 may provide an example of the transmit module 112 and/or the receive module 114 or a component thereof. For example, the transmit module 1100 may be a first PAiD, and the transmit module 112 and/or the receive module 114 may include several PAiDs, such as a mid- and high-band PAiD and a low-band PAiD. In some examples, the transmit module 1100 provides an example of a mid- and high-band PAiD. In various examples, the transmit module 1100 may support communication bands in use in geographical areas including India.

The transmit module 1100 includes an antenna connection 1102, a filter 1104, a coupler section 1106, a group of signal paths 1108, a first switching module 1110, a second switching module 1112, a third switching module 1114, a fourth switching module 1116, a first transmit connection 1118, a first receive connection 1120, a second receive connection 1122, a second transmit connection 1124, a third receive connection 1126, and a fourth receive connection 1128. The coupler section 1106 includes a transmission line 1130, a coupled line 1132, a fifth switching module 1134, a sixth switching module 1136, a seventh switching module 1138, a first coupler connection 1140, and a second coupler connection 1142.

The antenna connection 1102 is coupled to the filter 1104, and is configured to be coupled to at least one antenna, such as at least one mid- and/or high-band antenna. The filter 1104 is coupled to the antenna connection 1102 at a first connection, and is coupled to the group of signal paths 1108 via the transmission line 1130 at a second connection.

The group of signal paths 1108 is coupled to the filter 1104 via the transmission line 1130 at a first connection, and is coupled to the first switching module 1110, the second switching module 1112, and the third switching module 1114 at respective second connections. For example, the group of signal paths 1108 may include a B3 Tx signal path including a filter switchably coupled to a PA via the first switching module 1110, the PA being coupled to the first transmit connection 1118, a B1 Tx signal path including a filter switchably coupled to a PA via the first switching module 1110, the PA being coupled to the first transmit connection 1118, a B3 Rx signal path including a filter coupled to an LNA, the LNA being switchably coupled to the first receive connection 1120 via the third switching module 1114, a B1 Rx signal path including a filter coupled to an LNA, the LNA being switchably coupled to the second receive connection 1122 via the third switching module 1114, a B40 signal path including a filter switchably coupled to either a PA or an LNA via the second switching module 1112, the PA being coupled to the second transmit connection 1124 and the LNA being switchably coupled to the third receive connection 1126 via the fourth switching module 1116, and a B41 signal path including a filter switchably coupled to either a PA, a first LNA, or a second LNA, the PA being coupled to the second transmit connection 1124, the first LNA being switchably coupled to the third receive connection 1126 via the fourth switching module 1116, and the second LNA being switchably coupled to the fourth receive connection 1128 via the fourth switching module 1116.

The first switching module 1110 is coupled to the first transmit connection 1118 via a PA, the first connection being switchably coupled to a second connection coupled to the B3 Tx filter and a third connection coupled to the B1 Tx filter. The second switching module 1112 includes a first connection coupled to the B40 filter and a second connection coupled to the B41 filter, the first and second connections being switchably coupled to any of a third connection coupled to the second transmit connection 1124 via a PA, a fourth connection coupled to the fourth switching module 1116 via a first LNA, and a fifth connection coupled to the fourth switching module 1116 via a second LNA.

The third switching module 1114 includes a first connection coupled to the first receive connection 1120 and a second connection coupled to the second receive connection 1122, the first and second connections being switchably coupled to either of a third connection coupled to the B3 Rx filter via a first LNA and a fourth connection coupled to the B1 Rx filter via a second LNA. The fourth switching module 1116 includes a first connection coupled to the third receive connection 1126 and a second connection coupled to the fourth receive connection 1128, the first and second connections being switchably coupled to either of a third connection coupled to the fourth connection of the second switching module 1112 via a first LNA and a fourth connection coupled to the fifth connection of the second switching module 1112 via a second LNA.

The first transmit connection 1118 is coupled to the first connection of the first switching module 1110 via a PA, and is configured to be coupled to a transceiver. The first receive connection 1120 is coupled to the first connection of the third switching module 1114, and is configured to be coupled to a transceiver. The second receive connection 1122 is coupled to the second connection of the third switching module 1114, and is configured to be coupled to a transceiver. The second transmit connection 1124 is coupled to the third connection of the second switching module 1112 via a PA, and is configured to be coupled to a transceiver. The third receive connection 1126 is coupled to the first connection of the fourth switching module 1116, and is configured to be coupled to a transceiver. The fourth receive connection 1128 is coupled to the second connection of the fourth switching module 1116, and is configured to be coupled to a transceiver.

The components 1130-1142 of the coupler section 1106 may be configured in a substantially similar or identical manner to the components 744-756, respectively, of the coupler section 706, except that the transmission line 1130 is coupled between the filter 1104 and the group of signal paths 1108. Accordingly, the connections of the components 1130-1142 are not repeated for purposes of brevity.

The transmit module 1100 operates in a similar manner as the transmit modules 700, 800, 900. In some examples, the transmit module 1100 processes mid- and high-band signals in the B1, B3, B40, and B41 communication bands, which may be in use in such geographical regions as India.

Transmit signals may be received from a transceiver at either of the transmit connections 1118, 1124, routed to an appropriate signal path, and provided to an antenna via the antenna connection 1102. The coupler section 1106 may provide information indicative of the transmit signal conducted by the transmission line 1130 to either or both of the coupler connections 1140, 1142. The filter 1104 may be a notch filter configured to filter transmit signals provided to the antenna connection 1102.

Receive signals may be received from an antenna at the antenna connection 1102, routed to an appropriate signal path, and provided to a transceiver via any of the receive connections 1120, 1122, 1126, or 1128. The coupler section 1106 may provide information indicative of the receive signal conducted by the transmission line 1130 to either or both of the coupler connections 1140, 1142. The filter 1104 may be a notch filter configured to filter receive signals received from the antenna connection 1102.

In various examples, the transmit module 1100 may process signals in mid- and high-band frequency ranges. The transmit module 1100 may be implemented in a communication device having multiple transmit modules including the transmit module 1100 and one or more additional transmit modules. For example, a communication device may include the transmit module 1100, which may process mid- and/or high-band signals, and at least one additional transmit module to process low-band signals.

Figure 12:
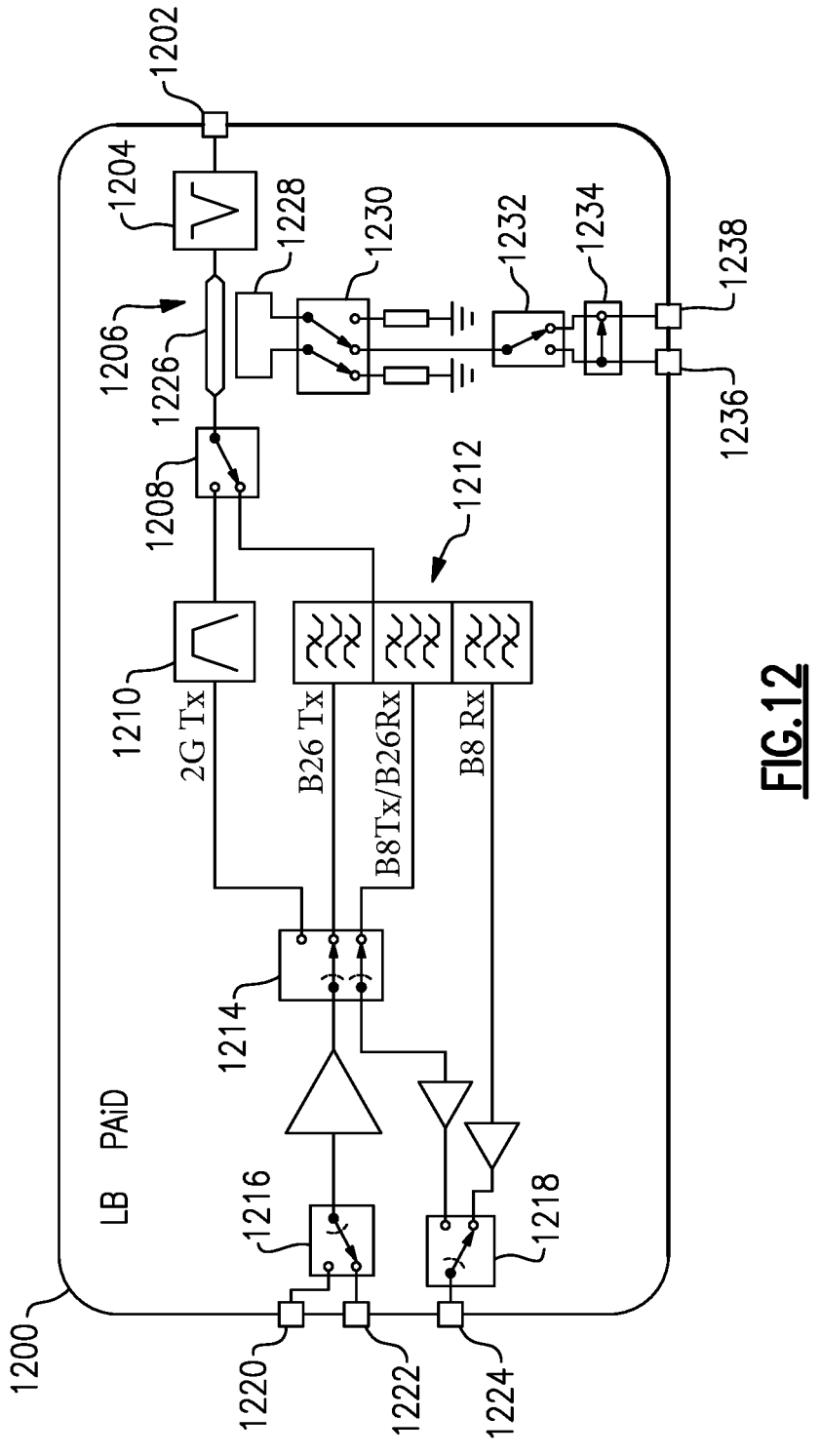
FIG. 12 illustrates a schematic diagram of a transmit module according to a fifth example.

FIG. 12 illustrates a schematic diagram of a transmit module 1200 according to an example. The transmit module 1200 may provide an example of the transmit module 112 and/or the receive module 114 or a component thereof. For example, the transmit module 1200 may be a first PAiD, and the transmit module 112 and/or the receive module 114 may include several PAiDs, such as a mid- and high-band PAiD and a low-band PAiD. In some examples, the transmit module 1200 provides an example of a low-band PAiD which may be implemented in additional to one or more mid- and/or high-band PAiDs, such as the transmit module 1100. In various examples, the transmit module 1200 may support communication bands in use in geographical areas including India.

The transmit module 1200 includes an antenna connection 1202, a first filter 1204, a coupler section 1206, a first switching module 1208, a second filter 1210, a group of signal paths 1212, a second switching module 1214, a third switching module 1216, a fourth switching module 1218, a first transmit connection 1220, a second transmit connection 1222, and a receive connection 1224. The coupler section 1206 includes a transmission line 1226, a coupled line 1228, a fifth switching module 1230, a sixth switching module 1232, a seventh switching module 1234, a first coupler connection 1236, and a second coupler connection 1238.

The antenna connection 1202 is coupled to the first filter 1204 and is configured to be coupled to at least one antenna, such as at least one low-band antenna. The first filter 1204 is coupled to the antenna connection 1202 at a first connection, and is coupled to the first switching module 1208 via the transmission line 1226 at a second connection. The first switching module 1208 includes a first connection coupled to the first filter 1204 via the transmission line 1226, the first connection being switchably coupled to either of a second connection coupled to the second filter 1210 and a third connection coupled to the group of signal paths 1212. The second filter 1210 is coupled to the first switching module 1208 at a first connection, and is coupled to the second switching module 1214 at a second connection.

The group of signal paths 1212 is coupled to the first switching module 1208 at a first connection, and is coupled to the second switching module 1214 and the fourth switching module 1218 at respective second connections. For example, the group of signal paths 1212 may include a B26 Tx signal path including a filter switchably coupled to a PA via the second switching module 1214, the PA being switchably coupled to either the first transmit connection 1220 or the second transmit connection 1222 via the third switching module 1216, a modified B8-Tx-and-B26-Rx signal path including a modified B8-Tx-and-B26-Rx filter switchably coupled to a PA and an LNA via the second switching module 1214, the PA being switchably coupled to either the first transmit connection 1220 or the second transmit connection 1222 via the third switching module 1216 and the LNA being switchably coupled to the receive connection 1224 via the fourth switching module 1218, and a B8 Rx signal path including a filter coupled to an LNA, the LNA being switchably coupled to the receive connection 1224 via the fourth switching module 1218. In various examples, the modified B8-Tx-and-B26-Rx filter is modified relative to a B8 Tx filter such that a lower frequency bound of the passband extends to approximately 869-915 MHz. The modified B8-Tx-and-B26-Rx filter may therefore filter both B8 Tx signals and B26 Rx signals. Accordingly, the modified B8-Tx-and-B26-Rx signal may process both B8 transmit signals and B26 receive signals.

The second switching module 1214 includes a first connection coupled to the third switching module 1216 via a PA and a second connection coupled to the fourth switching module 1218 via an LNA, the first and second connections being switchably connected to any of a third connection coupled to the second filter 1210, a fourth connection coupled to the B26 Tx filter, and a fifth connection coupled to the modified B8-Tx-and-B26-Rx filter. The third switching module 1216 is coupled to the first connection of the second switching module 1214 via a PA, the first connection being switchably coupled to either of a second connection coupled to the first transmit connection 1220 or a third connection coupled to the second transmit connection 1222.

The fourth switching module 1218 includes a first connection coupled to the receive connection 1224, the first connection being switchably coupled to either of a second connection coupled to the second connection of the second switching module 1214 via a first LNA or a third connection coupled to the B8 Rx filter via a second LNA. The first transmit connection 1220 is coupled to the second connection of the third switching module 1216, and is configured to be coupled to a transceiver. The second transmit connection 1222 is coupled to the third connection of the third switching module 1216, and is configured to be coupled to a transceiver. The receive connection 1224 is coupled to the first connection of the fourth switching module 1218, and is configured to be coupled to a transceiver.

The components 1226-1238 of the coupler section 1206 may be configured in a substantially similar or identical manner to the components 744-756, respectively, of the coupler section 706, except that the transmission line 1226 is coupled between the first filter 1204 and the first switching module 1208. Accordingly, the connections of the components 1226-1238 are not repeated for purposes of brevity.

The transmit module 1200 operates in a similar manner as the transmit modules 700, 800, 900, 1100. In some examples, the transmit module 1200 processes low-band signals in the B8 and B26 communication bands, as well as 2G transmit signals, which may be in use in such geographical regions as India. Transmit signals may be received from a transceiver at either of the transmit connections 1220, 1222, routed to an appropriate signal path including any signal path of the group of signal paths 1212 and/or the second filter 1210, which may be a bandpass filter configured to pass 2G transmit signals, and provided to an antenna via the antenna connection 1202. The coupler section 1206 may provide information indicative of the transmit signal conducted by the transmission line 1226 to either or both of the coupler connections 1236, 1238. The first filter 1204 may be a notch filter configured to filter transmit signals provided to the antenna connection 1202.

Receive signals may be received from an antenna at the antenna connection 1202, routed to an appropriate signal path including any signal path of the group of signal paths 1212 and/or the second filter 1210, which may be a bandpass filter configured to pass 2G transmit signals, and provided to a transceiver via the receive connection 1224. The coupler section 1206 may provide information indicative of the receive signal conducted by the transmission line 1226 to either or both of the coupler connections 1236, 1238. The first filter 1204 may be a notch filter configured to filter receive signals received from the antenna connection 1202.

As discussed above, the second filter 1210 may include a bandpass filter configured to pass 2G signals. In other examples, a transmit module may process 2G signals without a dedicated 2G signal path. For example, 2G signals may be processed through other signal paths which also process other signals in addition to 2G signals. Processing 2G signals through signal paths which also process other signals may reduce a size, cost, and complexity of a communication device while reducing power consumption.

Figure 13:
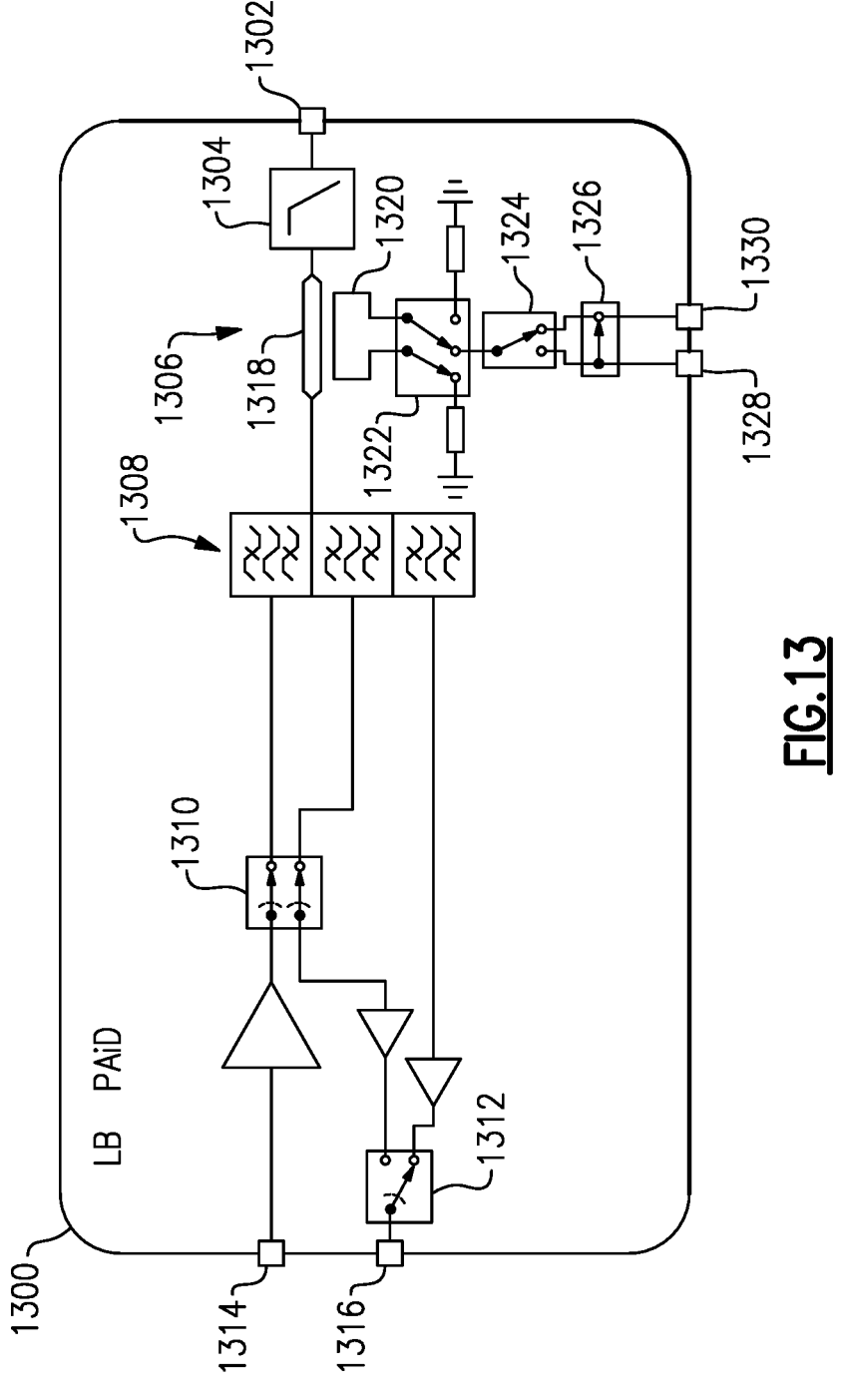
FIG. 13 illustrates a schematic diagram of a transmit module according to a sixth example.

FIG. 13 illustrates a schematic diagram of a transmit module 1300 according to an example. The transmit module 1300 may provide an example of the transmit module 112 and/or the receive module 114 or a component thereof. For example, the transmit module 1300 may be a first PAiD, and the transmit module 112 and/or the receive module 114 may include several PAiDs, such as a mid- and high-band PAiD and a low-band PAiD. In some examples, the transmit module 1300 provides an example of a low-band PAiD which may be implemented in additional to one or more mid- and/or high-band PAiDs, such as the transmit module 1100. In various examples, the transmit module 1300 may support communication bands in use in geographical areas including India.

The transmit module 1300 includes an antenna connection 1302, a filter 1304, a coupler section 1306, a group of signal paths 1308, a first switching module 1310, a second switching module 1312, a transmit connection 1314, and a receive connection 1316. The coupler section 1306 includes a transmission line 1318, a coupled line 1320, a third switching module 1322, a fourth switching module 1324, a fifth switching module 1326, a first coupler connection 1328, and a second coupler connection 1330.

The antenna connection 1302 is coupled to the filter 1304, and is configured to be coupled to at least one antenna, such as at least one low-band antenna. The filter 1304 is coupled to the antenna connection 1302 at a first connection, and is coupled to the group of signal paths 1308 via the transmission line 1318 at a second connection.

The group of signal paths 1308 is coupled to the filter 1304 via the transmission line 1318 at a first connection, and is coupled to the first switching module 1310 and the second switching module 1312 at respective second connections. For example, the group of signal paths 1308 may include a B26 Tx signal path including a filter switchably coupled to a PA via the first switching module 1310, the PA being coupled to the transmit connection 1314, a modified B8-Tx-and-B26-Rx signal path including a modified B8-Tx-and-B26-Rx filter switchably coupled to a PA and an LNA via the first switching module 1310, the PA being switchably coupled to the transmit connection 1314 and the LNA being switchably coupled to the receive connection 1316 via the second switching module 1312, and a B8 Rx signal path including a filter coupled to an LNA, the LNA being switchably coupled to the receive connection 1316 via the second switching module 1312. In various examples, the modified B8-Tx-and-B26-Rx filter is modified relative to a B8 Tx filter such that a lower frequency bound of the passband extends to approximately 869-915 MHz. The modified B8-Tx-and-B26-Rx filter may therefore filter both B8 Tx signals and B26 Rx signals. Accordingly, the modified B8-Tx-and-B26-Rx signal may process both B8 transmit signals and B26 receive signals.

The first switching module 1310 includes a first connection coupled to the transmit connection 1314 via a PA and a second connection coupled to the second switching module 1312 via an LNA, the first and second connections being switchably coupled to either of a third connection coupled to the B26 Tx filter or a fourth connection coupled to the modified B8-Tx-and-B26-Rx filter. The second switching module 1312 includes a first connection coupled to the receive connection 1316, the first connection being switchably coupled to either a first connection coupled to the second connection of the first switching module 1310 via a first LNA or a third connection coupled to the B8 Rx filter via a second LNA. The transmit connection 1314 is coupled to the first connection of the first switching module 1310 via a PA, and is configured to be coupled to a transceiver. The receive connection 1316 is coupled to the first connection of the second switching module 1312, and is configured to be coupled to a transceiver.

The components 1318-1330 of the coupler section 1306 may be configured in a substantially similar or identical manner to the components 744-756, respectively, of the coupler section 706, except that the transmission line 1318 is coupled between the filter 1304 and the group of signal paths 1308. Accordingly, the connections of the components 1318-1330 are not repeated for purposes of brevity.

The transmit module 1300 operates in a similar manner as the transmit modules 700, 800, 900, 1100, 1200. In some examples, the transmit module 1300 processes low-band signals in the B8 and B26 communication bands, as well as 2G transmit signals, which may be in use in such geographical regions as India. Transmit signals may be received from a transceiver at the transmit connection 1314, routed to an appropriate signal path including any signal path of the group of signal paths 1308, and provided to an antenna via the antenna connection 1302. The coupler section 1306 may provide information indicative of the transmit signal conducted by the transmission line 1318 to either or both of the coupler connections 1328, 1330. The filter 1304 may be a notch filter configured to filter transmit signals provided to the antenna connection 1302.

Receive signals may be received from an antenna at the antenna connection 1302, routed to an appropriate signal path including any signal path of the group of signal paths 1308, and provided to a transceiver via the receive connection 1316. The coupler section 1306 may provide information indicative of the receive signal conducted by the transmission line 1318 to either or both of the coupler connections 1328, 1330. The filter 1304 may be a notch filter configured to filter receive signals received from the antenna connection 1302.

As discussed above, communication devices may include multiple transmit modules, such as a mid- and high-band transmit module (including, for example, the transmit module 1100) and a low-band transmit module (including, for example, the transmit module 1200 and/or 1300). In various examples, communication devices may additionally or alternatively include a transmit module configured to process low-, mid-, and high-band signals.

Figure 14:
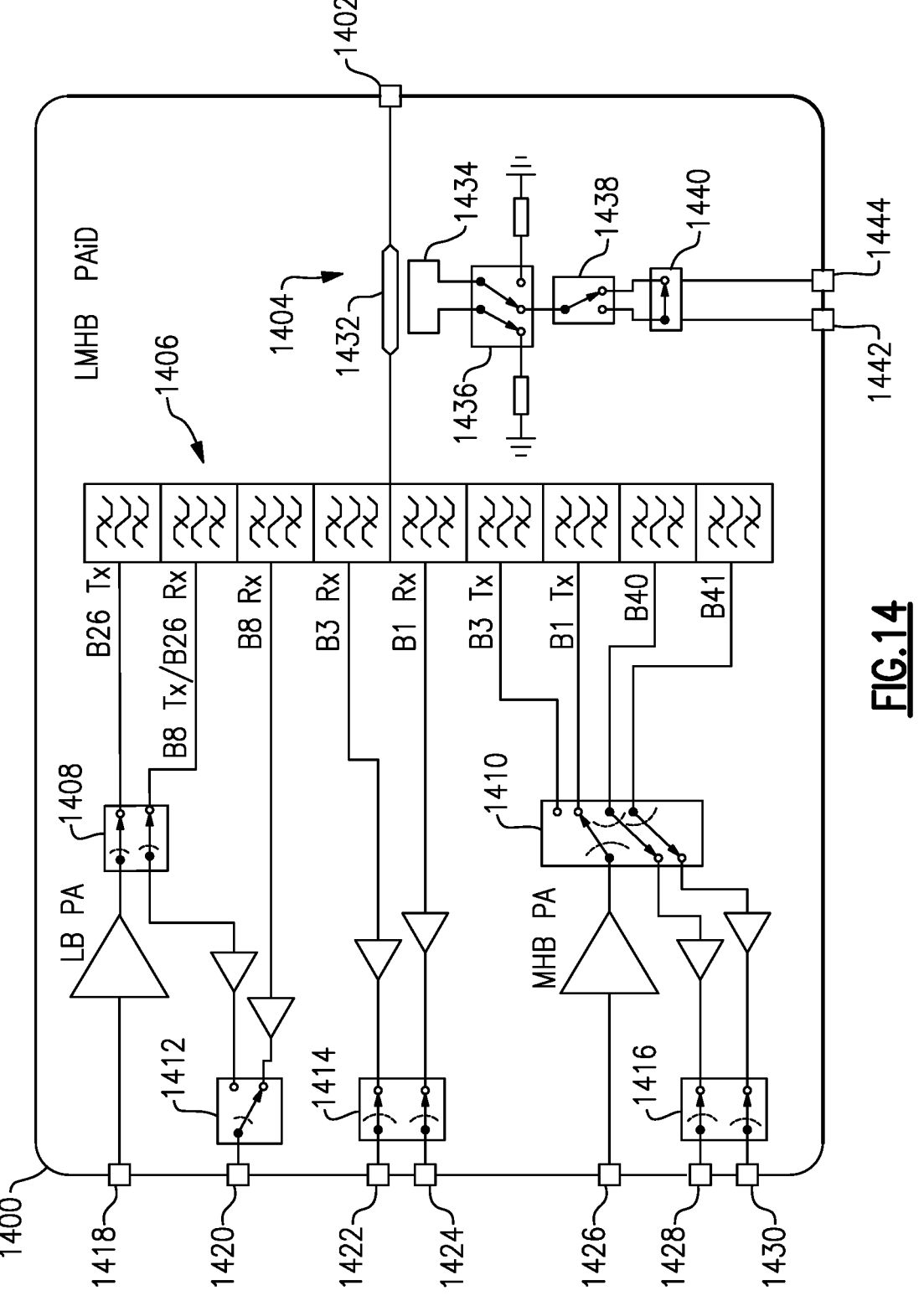
FIG. 14 illustrates a schematic diagram of a transmit module according to a seventh example.

FIG. 14 illustrates a schematic diagram of a transmit module 1400 according to an example. The transmit module 1400 may provide an example of the transmit module 112 and/or the receive module 114 or a component thereof. In some examples, the transmit module 1400 provides an example of a low-, mid-, and high-band PAiD. In various examples, the transmit module 1400 may support communication bands in use in geographical areas including India.

The transmit module 1400 includes an antenna connection 1402, a coupler section 1404, a group of signal paths 1406, a first switching module 1408, a second switching module 1410, a third switching module 1412, a fourth switching module 1414, a fifth switching module 1416, a first transmit connection 1418, a first receive connection 1420, a second receive connection 1422, a third receive connection 1424, a second transmit connection 1426, a fourth receive connection 1428, and a fifth receive connection 1430. The coupler section 1404 includes a transmission line 1432, a coupled line 1434, a sixth switching module 1436, a seventh switching module 1438, an eighth switching module 1440, a first coupler connection 1442, and a second coupler connection 1444.

The antenna connection 1402 is coupled to the group of signal paths 1406 via the transmission line 1432, and is configured to be coupled to at least one antenna, such as at least one low-, mid-, and/or high-band antenna. The group of signal paths 1406 is coupled to the antenna connection 1402 via the transmission line 1432 at a first connection, and is configured to be coupled to the first switching module 1408, the second switching module 1410, the third switching module 1412, and the fourth switching module 1414 at respective second connections.

For example, the group of signal paths 1406 may include a B26 Tx signal path including a filter switchably coupled to a PA via the first switching module 1408, the PA being coupled to the first transmit connection 1418, a B8-Tx-and-B26-Rx signal path including a B8-Tx-and-B26-Rx filter switchably coupled to an LNA via the first switching module 1408, the LNA being switchably coupled to the first receive connection 1420 via the third switching module 1412, a B8 Rx signal path including a filter coupled to an LNA, the LNA being switchably coupled to the first receive connection 1420 via the third switching module 1412, a B3 Rx signal path including a filter coupled to an LNA, the LNA being switchably coupled to the second receive connection 1422 via the fourth switching module 1414, a B1 Rx signal path including a filter coupled to an LNA, the LNA being switchably coupled to the third receive connection 1424 via the fourth switching module 1414, a B3 Tx signal path including a filter switchably coupled to a PA via the second switching module 1410, the PA being coupled to the second transmit connection 1426, a B1 Tx signal path including a filter switchably coupled to a PA via the second switching module 1410, a B40 signal path including a filter switchably coupled to a PA and an LNA via the second switching module 1410, the PA being coupled to the second transmit connection 1426 and the LNA being switchably coupled to the fourth receive connection 1428 via the fifth switching module 1416, and a B41 signal path including a filter switchably coupled to a PA and an LNA via the second switching module 1410, the PA being coupled to the second transmit connection 1426 and the LNA being switchably coupled to the fifth receive connection 1430 via the fifth switching module 1416.

The first switching module 1408 includes a first connection coupled to the first transmit connection 1418 via a PA and a second connection coupled to the third switching module 1412 via an LNA, the first and second connections being switchably coupled to either of a third connection coupled to the B26 Tx filter or a fourth connection coupled to the B8-Tx-and-B26-Rx filters. The second switching module 1410 includes a first connection coupled to the second transmit connection 1426 via a PA, the first connection being switchably coupled to any of a second connection coupled to the B3 Tx filter, a third connection coupled to the B1 Tx filter, a fourth connection coupled to the B40 filter, or a fifth connection coupled to the B41 filter, the fourth connection and the fifth connection also being switchably coupled to either of a sixth connection coupled to the fifth switching module 1416 via a first LNA or a seventh connection coupled to the fifth switching module 1416 via second LNA.

The third switching module 1412 includes a first connection coupled to the first receive connection 1420, the first connection being switchably coupled to either of a second connection coupled to the second connection of the first switching module 1408 via a first LNA or a third connection coupled to the B8 Rx filter via a second LNA. The fourth switching module 1414 includes a first connection coupled to the second receive connection 1422 and a second connection coupled to the third receive connection 1424, the first and second connections being switchably connected to either of a third connection coupled to the B3 Rx filter via a first LNA or a fourth connection coupled to the B1 Rx filter via a second LNA. The fifth switching module 1416 includes a first connection coupled to the fourth receive connection 1428 and a second connection coupled to the fifth receive connection 1430, the first and second connections being switchably coupled to either of a third connection coupled to the sixth connection of the second switching module 1410 via a first LNA or a fourth connection coupled to the seventh connection of the second switching module 1410 via a second LNA.

The components 1432-1444 of the coupler section 1404 may be configured in a substantially similar or identical manner to the components 744-756, respectively, of the coupler section 706, except that the transmission line 1432 is coupled between the antenna connection 1402 and the group of signal paths 1406. Accordingly, the connections of the components 1432-1444 are not repeated for purposes of brevity.

The transmit module 1400 operates in a similar manner as the transmit modules 700, 800, 900, 1100, 1200, 1300. In some examples, the transmit module 1400 processes low-, mid-, and high-band signals in the B1, B3, B8, B26, B40, and B41 communication bands, as well as 2G transmit signals via, for example, the B26 Tx and/or B8-Tx-and-B26-Rx signal paths, which may be in use in such geographical regions as India. Transmit signals may be received from a transceiver at either of the transmit connections 1418, 1426, routed to an appropriate signal path including any signal path of the group of signal paths 1406, and provided to an antenna via the antenna connection 1402. The coupler section 1404 may provide information indicative of the transmit signal conducted by the transmission line 1432 to either or both of the coupler connections 1442, 1444.

Receive signals may be received from an antenna at the antenna connection 1402, routed to an appropriate signal path including any signal path of the group of signal paths 1406, and provided to a transceiver via any of the receive connections 1420, 1422, 1424, 1428, and/or 1430. The coupler section 1404 may provide information indicative of the receive signal conducted by the transmission line 1432 to either or both of the coupler connections 1442, 1444.

Examples of the disclosure provide communication devices having one or more improved transmit and/or receive modules. Example communication devices may include one or more improved DRx modules and/or PAiD modules which may be less expensive, less complex, and/or smaller, and which may consume less power. In various examples, switching modules (for example, ASMs) may be removed by ganging non-overlapping signal paths together and switchably coupling overlapping signal paths in parallel with the ganged signal paths, such that performance of the ganged signal paths is not substantially affected by the ASM introducing in-series insertion loss. Furthermore, in some examples, a single antenna connection may be coupled to multiple antennas rather than implementing several antenna connections each coupled to a respective antenna. In various examples, the single antenna connection may be coupled directly to ganged signal paths rather than, for example, via an ASM.

Various controllers may execute various operations discussed above. For example, the wireless device 100 may include one or more controllers (for example, in the power-management system 110). Using data stored in associated memory and/or storage, the one or more controls may also execute one or more instructions stored on one or more non-transitory computer-readable media, which the one or more controllers may include and/or be coupled to, that may result in manipulated data. In some examples, the one or more controllers may include one or more processors or other types of controllers. In one example, the one or more controllers are or include at least one processor. In another example, the one or more controllers perform at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

As discussed above, in some examples, non-overlapping signal paths may be ganged together, and overlapping signal paths may be switchably coupled in parallel with the non-overlapping signal paths. In various examples, signal paths which are not strictly overlapping (that is, signal paths corresponding to frequency bands which do not share any common frequency values) may nonetheless be switchably coupled in parallel with the non-overlapping signal paths if, for example, a first signal path corresponds to a first communication band which is within a threshold frequency of a second communication band of a second signal path. For example, a first signal path and a second signal path may not be ganged together with non-overlapping signal paths if, for example, an upper bound of the first signal path is within 5 MHz (or another frequency value, such as 1 MHz, 10 MHz, 12.5 MHz, and so forth) of a lower bound of the second signal path.

Various examples provided above include switching modules. In various examples, switching modules may include one or more switches, such as SPST switches, SPDT switches, and so forth. In other examples, a switching module may include other switching devices configured to switchably connect and/or disconnect certain connections of the switching module to other connections of the switching module.

Examples provided above include modules having connections configured to be coupled to a transceiver, such as the first outputs 408, 522, and 616, the first receive connections 730 and 826, the first transmit connections 732, 822, and 918, and so forth. In various examples, such connections that are configured to be coupled to a transceiver, whether the connections are intended to receive transmit signals or receive signals, may be referred to as "transceiver connections."

Various examples provided above include receive modules and/or transmit modules implemented in communication devices, such as wireless communication devices. In various examples, either or both of the receive modules and transmit modules may be referred to as "signal-processing circuitry." For example, one or more of the modules 200, 300, 400, 500, 600, 700, 800, 900, 1000, 1100, 1200, 1300, and/or 1400 may be referred to as "signal-processing circuitry."

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A front-end module comprising:
at least one antenna connection configured to be coupled to at least one antenna;
at least one transceiver connection configured to be coupled to at least one transceiver;
a plurality of ganged signal paths coupled between the at least one antenna connection and the at least one transceiver connection, the plurality of ganged signal paths corresponding to a plurality of non-overlapping communication bands; and
a plurality of switchable signal paths switchably coupled between the at least one antenna connection and the at least one transceiver connection, the plurality of switchable signal paths including a first signal path corresponding to a first frequency range and a second signal path corresponding to a second frequency range, the first frequency range not overlapping with the second frequency range, and an upper bound of the first frequency range being within a threshold frequency value of a lower band of the second frequency range.

2. The front-end module of claim 1 wherein the plurality of ganged signal paths is connected directly to the at least one antenna connection.

3. The front-end module of claim 1 wherein the plurality of switchable signal paths is switchably coupled to the at least one antenna connection via at least one switching module.

4. The front-end module of claim 3 wherein the at least one switching module includes a first connection coupled between the plurality of ganged signal paths and the at least one antenna connection, and a plurality of second connections.

5. The front-end module of claim 4 wherein each second connection of the plurality of second connections is coupled to at least one signal path of the plurality of switchable signal paths.

6. The front-end module of claim 5 wherein at least one second connection of the plurality of second connections is coupled to a plurality of ganged switchable signal paths of the plurality of switchable signal paths.

7. The front-end module of claim 6 wherein the plurality of ganged switchable signal paths corresponds to a second plurality of non-overlapping communication bands.

8. The front-end module of claim 4 wherein the plurality of ganged signal paths is connected directly to the at least one antenna connection via a direct connection, and wherein the first connection of the at least one switching module is coupled to the direct connection.

9. The front-end module of claim 1 further comprising a second plurality of switchable signal paths switchably coupled between the at least one antenna connection and the at least one transceiver connection, wherein the second plurality of switchable signal paths includes a third signal path corresponding to a third frequency range and a fourth signal path corresponding to a fourth frequency range, wherein the third frequency range overlaps the fourth frequency range or shares a common band edge with the fourth frequency range.

10. The front-end module of claim 1 further comprising a diversity receive module including the at least one antenna connection, the at least one transceiver connection, the plurality of ganged signal paths, and the plurality of switchable signal paths.

11. The front-end module of claim 1 further comprising a power-amplifier-with-integrated-duplexer module including the at least one antenna connection, the at least one transceiver connection, the plurality of ganged signal paths, and the plurality of switchable signal paths.

12. The front-end module of claim 1 wherein the plurality of ganged signal paths and the plurality of switchable signal paths collectively support the B1, B3, B8, B26, B34, B39, B40, and B41 communication bands.

13. The front-end module of claim 12 wherein the plurality of ganged signal paths supports the B1, B8, B26, and B40 communication bands.

14. The front-end module of claim 13 wherein the plurality of switchable signal paths supports the B3, B34, B39, and B41 communication bands.

15. The front-end module of claim 14 wherein the plurality of switchable signal paths supports the B7 communication band.

16. The front-end module of claim 13 wherein the plurality of ganged signal paths supports the B34 and B41 communication bands.

17. The front-end module of claim 16 wherein the plurality of switchable signal paths supports the B3 and B39 communication bands.

* * * * *